(12) United States Patent
Kemmochi et al.

(10) Patent No.: US 8,131,226 B1
(45) Date of Patent: Mar. 6, 2012

(54) MULTI-BAND-HIGH-FREQUENCY CIRCUIT, MULTI-BAND HIGH-FREQUENCY CIRCUIT COMPONENT AND MULTI-BAND COMMUNICATION APPARATUS USING SAME

(75) Inventors: Shigeru Kemmochi, Kumagaya (JP);
Kazuhiro Hagiwara, Kumagaya (JP);
Keisuke Fukamachi, Kumagaya (JP);
Takahiro Yamashita, Kumagaya (JP);
Masayuki Uchida, Tottori (JP);
Mitsuhiro Watanabe, Tottori (JP)

(73) Assignee: Hitachi Metals, Ltd., Tokyo (JP)

( * ) Notice: Subject to any disclaimer, the term of this patent is extended or adjusted under 35 U.S.C. 154(b) by 538 days.

(21) Appl. No.: 11/721,496

(22) PCT Filed: Dec. 6, 2005

(86) PCT No.: PCT/JP2005/022393
§ 371 (c)(1),
(2), (4) Date: Jun. 12, 2007

(87) PCT Pub. No.: WO2006/064691
PCT Pub. Date: Jun. 22, 2006

(30) Foreign Application Priority Data

Dec. 13, 2004 (JP) ................................. 2004-360126
Jun. 21, 2005 (JP) ................................. 2005-180706

(51) Int. Cl.
*H04B 1/44* (2006.01)
(52) U.S. Cl. .............. 455/83; 455/78; 455/82; 455/280; 455/284; 455/552.1; 455/553.1; 333/25; 333/100; 333/101; 333/103

(58) Field of Classification Search .............. 455/78–83, 455/280–282, 284–293, 121, 123–124, 296, 455/338–339, 552.1, 553.1; 333/25, 262, 333/204, 185, 100–106
See application file for complete search history.

(56) References Cited

U.S. PATENT DOCUMENTS
6,009,314 A * 12/1999 Bjork et al. ..................... 455/83
(Continued)

FOREIGN PATENT DOCUMENTS
CN 1409571 A 4/2003
(Continued)

OTHER PUBLICATIONS
European Application No. 05 814 211.8; dated Oct. 19, 2010.
(Continued)

*Primary Examiner* — Tuan A Tran
(74) *Attorney, Agent, or Firm* — Sughrue Mion, PLLC

(57) ABSTRACT

A high-frequency circuit comprising a high-frequency switch circuit for switching the three-way connection of an antenna to a transmitting circuit for the first communications system, a receiving circuit for a first communications system, and a transmitting/receiving circuit for a second communications system; a first bandpass filter disposed between the antenna and the high-frequency switch circuit; and a balanced-unbalanced conversion circuit disposed between the receiving circuit of the first communications system and the high-frequency switch circuit.

7 Claims, 29 Drawing Sheets

U.S. PATENT DOCUMENTS

| | | | |
|---|---|---|---|
| 6,108,313 | A | 8/2000 | Lee et al. |
| 6,553,210 | B1 | 4/2003 | Lindemann et al. |
| 6,560,443 | B1 | 5/2003 | Vaisanen et al. |
| 6,735,418 | B1 * | 5/2004 | MacNally et al. ............... 455/78 |
| 6,982,609 | B1 * | 1/2006 | McKay et al. .................. 333/25 |
| 6,985,712 | B2 * | 1/2006 | Yamakawa et al. ............ 455/333 |
| 7,010,273 | B2 * | 3/2006 | Satoh et al. ...................... 455/83 |
| 7,046,649 | B2 | 5/2006 | Awater et al. |
| 7,283,793 | B1 * | 10/2007 | McKay ............................ 455/83 |
| 7,292,827 | B2 * | 11/2007 | McCorkle ........................ 455/78 |
| 2002/0034934 | A1 * | 3/2002 | Watanabe et al. ............. 455/318 |
| 2003/0045244 | A1 | 3/2003 | Lindemann et al. |
| 2003/0085774 | A1 * | 5/2003 | Uriu et al. |
| 2004/0048634 | A1 * | 3/2004 | Satoh et al. |
| 2004/0185795 | A1 | 9/2004 | Shamsaifar et al. |
| 2004/0198420 | A1 | 10/2004 | He et al. |
| 2004/0224644 | A1 | 11/2004 | Wu et al. |
| 2004/0266378 | A1 | 12/2004 | Fukamachi et al. |

FOREIGN PATENT DOCUMENTS

| | | | |
|---|---|---|---|
| DE | 2322772 A | | 9/1998 |
| EP | 1418680 A1 | | 5/2004 |
| JP | 11-074819 A | | 3/1999 |
| JP | 2001-24579 A | | 1/2001 |
| JP | 2001-203604 A | | 7/2001 |
| JP | 2001-217853 A | | 10/2001 |
| JP | 2002-118487 A | | 4/2002 |
| JP | 2002-208874 A | | 7/2002 |
| JP | 2002-261674 A | | 9/2002 |
| JP | 2003/018039 A | | 1/2003 |
| JP | 2003-87150 A | * | 3/2003 |
| JP | 2003-143033 A | * | 5/2003 |
| JP | 2003-152590 A | * | 5/2003 |
| JP | 2003-174453 A | | 6/2003 |
| JP | 2003-198419 A | * | 7/2003 |
| JP | 2003-273687 A | | 9/2003 |
| JP | 2004-015162 A | | 1/2004 |
| JP | 2004-032462 A | | 1/2004 |
| JP | 2004-040322 A | | 2/2004 |
| JP | 2004-140696 A | * | 5/2004 |
| JP | 2004-147166 A | | 5/2004 |
| JP | 2004-304471 A | | 10/2004 |

OTHER PUBLICATIONS

Notification of Reasons for Refusal dated Mar. 9, 2011, issued by JPO, in JP Application No. 2006-548778, together with English translation.

Chinese Office Action dated Jun. 13, 2011 issued in a corresponding Chinese Patent Application No. 200580041644.4.

* cited by examiner

MULTI-BAND-HIGH-FREQUENCY CIRCUIT, MULTI-BAND HIGH-FREQUENCY CIRCUIT COMPONENT AND MULTI-BAND COMMUNICATION APPARATUS USING SAME

FIELD OF THE INVENTION

The present invention relates to a wireless communications apparatus for performing wireless transmission between electronic or electric equipments, particularly to a high-frequency circuit commonly usable in at least two communications systems using substantially the same frequency band, a high-frequency device comprising such a high-frequency circuit, and a communications apparatus comprising such a high-frequency device.

BACKGROUND OF THE INVENTION

An industrial, scientific and medical (ISM) band at 2.4 GHz is used in wireless LAN (WLAN) communications according to the IEEE 802.11 standard, such as direct sequence spread spectrum (DSSS) wireless communications, etc. Also proposed is a short-distance wireless standard Bluetooth™, an extremely convenient technology capable of making connection between associated electronic equipments without using a cable, in an ISM band of 2.4 GHz, the same as in the wireless LAN (WLAN).

A major wireless LAN standard utilizing an ISM band of 2.4 GHz has IEEE 802.11b and IEEE 802.11g. The IEEE 802.11b is a DSSS system, supporting high-speed communications at 5.5 Mbps and 11 Mbps. The IEEE 802.11g uses an orthogonal frequency division multiplex (OFDM) modulation system, supporting high-speed data communications at 54 Mbps at maximum.

Bluetooth divides the ISM frequency band of 2.4 GHz to pluralities of wireless channels, each of which is then divided by a unit time ($1/1600$ seconds) to time slots. The wireless channels used are switched by the time slots to provide a frequency-hopping system with excellent noise resistance.

Wireless LAN utilized by small groups in a short distance range within about 50-100 m has such a high data transmission speed as several Mbps to several tens of Mbps, consuming power of about 100 mW. In Bluetooth utilized in a relatively narrow area such as the same compound or building, etc., however, the reach of electromagnetic waves is as short as about 10 m, and its transmission speed is 2 Mbps at most, with as small power consumption as about 10 mW. Because wireless LAN and Bluetooth are different in transmission speed and reach, etc., both of them may be used in one communications apparatus, so that a more advantageous one is used depending on applications.

Explanation will be made below, for instance, with wireless LAN (IEEE 802.11b, IEEE 802.11g) as a first communications system, and Bluetooth as a second communications system.

JP2001-24579 A discloses a circuit usable for both circuits of wireless LAN and Bluetooth, which comprises a first switch circuit for switching the connection of a first antenna port to a transmitting circuit for a first communications system and a second switch circuit, the second switch circuit switching the connection of the receiving circuit of the first communications system to the first switch circuit and a third switch circuit, the third switch circuit switching the connection of the second antenna port to a transmitting/receiving circuit for the second communications system and the second switch circuit; a first filter disposed between the first switch circuit and a transmitting circuit for the first communications system; and a second filter disposed between the second switch circuit and the receiving circuit of the first communications system, as shown in FIG. 35.

With the circuit described in JP2001-24579 A, however, the miniaturization of communications apparatuses is difficult, (a) because it needs two filters, a first filter between the first switch circuit and the transmitting circuit for the first communications system, and a second filter between the second switch circuit and the receiving circuit of the first communications system, and (b) because the receiving circuit of the first communications system is constituted such that it is connected to the first and second antenna ports, resulting in a complicated circuit.

JP2002-208874 A discloses composite wireless device using substantially the same frequency band, which comprises a first splitter for inputting first and second outputs, a power amplifier for inputting the output of the first splitter, an antenna switch for inputting the output of the power amplifier, a low-noise amplifier on the receiving side of the antenna switch, and a second splitter for inputting the output of the low-noise amplifier, the transmitting circuit having such a structure that an output one of different two transmitting signals is selected by the first splitter and then amplified by the power amplifier, and the receiving circuit having such a structure that received waves are distributed to two signals by the second splitter disposed on the output side of the low-noise amplifier, as shown in FIG. 36. In this composite wireless device, the power amplifier and the low-noise amplifier are used for both signals. Specifically, the power amplifier is used for both the transmitting waves of wireless LAN and the transmitting waves of Bluetooth. However, because recent Bluetooth having low transmitting output power does not need a power amplifier, such common use has become unnecessary.

OBJECTS OF THE INVENTION

Accordingly, an object of the present invention is to provide a high-frequency circuit capable of being used for both wireless LAN and Bluetooth, particularly to a high-frequency circuit that can be miniaturized because of a small number of parts, and a high-frequency circuit device and a communications apparatus comprising such a high-frequency circuit.

DISCLOSURE OF THE INVENTION

The first high-frequency circuit of the present invention, which is disposed between an antenna capable of transmitting and receiving in at least two different communications systems and transmitting/receiving circuits for at least two different communications systems, comprises a high-frequency switch circuit for switching the three-way connection of the antenna to the transmitting circuit and receiving circuit of the first communications system, and the transmitting/receiving circuit of the second communications system; a first bandpass filter disposed between the antenna and the high-frequency switch circuit; and a balanced-unbalanced conversion circuit disposed between the receiving circuit of the first communications system and the high-frequency switch circuit.

In the first high-frequency circuit, a balanced-unbalanced conversion circuit is preferably disposed between the transmitting/receiving circuit for the second communications system and the high-frequency switch circuit.

The second high-frequency circuit of the present invention, which is disposed between an antenna capable of transmitting and receiving in at least two different communications systems and transmitting/receiving circuits for at least two different communications systems, comprises: a high-frequency switch circuit for switching the three-way connection of the antenna to a transmitting circuit for the first communications system, a transmitting circuit for the second communications system, and a receiving circuit for both of the first and second communications systems; a first bandpass filter disposed between the antenna and the high-frequency switch circuit; a splitter or coupler circuit disposed in a path connected to both circuits for splitting or branching a received signal to the receiving circuit for the first communications system and the receiving circuit for the second communications system; and a balanced-unbalanced conversion circuit disposed between the splitter or coupler circuit and the receiving circuit for the first communications system.

In the second high-frequency circuit, a balanced-unbalanced conversion circuit is preferably disposed between the splitter or coupler circuit and the receiving circuit for the second communications system, and a balanced-unbalanced conversion circuit is preferably disposed between the transmitting circuit for the second communications system and the high-frequency switch circuit.

The third high-frequency circuit of the present invention, which is disposed between an antenna capable of transmitting and receiving in at least two different communications systems and transmitting/receiving circuits for at least two different communications systems, comprises a high-frequency switch circuit for switching the two-way connection of the antenna to a transmitting circuit for the first communications system, and a path connected to both of a receiving circuit for the first communications system and a transmitting/receiving circuit for the second communications system; a first bandpass filter disposed between the antenna and the high-frequency switch circuit; and a splitter or coupler circuit disposed in the path connected to both of the receiving circuit for the first communications system and the transmitting/receiving circuit for the second communications system to split or branch a signal to both circuits.

In the third high-frequency circuit, a balanced-unbalanced conversion circuit is preferably disposed between the splitter or coupler circuit and the receiving circuit for the first communications system, and a balanced-unbalanced conversion circuit is preferably disposed between the splitter or coupler circuit and the transmitting/receiving circuit for the second communications system.

The fourth high-frequency circuit, which is disposed between an antenna capable of transmitting and receiving in at least two different communications systems and transmitting/receiving circuits for at least two different communications systems, comprises a high-frequency switch circuit for switching the two-way connection of the antenna to a transmitting circuit for the first communications system and a receiving circuit for the first communications system; a first bandpass filter disposed between the antenna and the high-frequency switch circuit; and a splitter or coupler circuit disposed between the first bandpass filter and the high-frequency switch circuit, or between the first bandpass filter and the antenna to split or branch a signal to the transmitting/receiving circuit for the second communications system.

In the fourth high-frequency circuit, a balanced-unbalanced conversion circuit is preferably disposed between the receiving circuit for the first communications system and the high-frequency switch circuit, and a balanced-unbalanced conversion circuit is preferably disposed between the transmitting/receiving circuit for the second communications system and the splitter or coupler circuit.

In each of the first to fourth high-frequency circuits, a high-frequency power amplifier circuit is preferably disposed between the transmitting circuit for the first communications system and the high-frequency switch circuit, and a second bandpass filter is preferably disposed between the high-frequency power amplifier circuit and the transmitting circuit for the first communications system. Further, a balanced-unbalanced conversion circuit is preferably disposed between the transmitting circuit for the first communications system and the high-frequency power amplifier circuit.

The high-frequency circuit device of the present invention having the above high-frequency circuit is constituted by a laminate of dielectric ceramics and electrode patterns, and at least one semiconductor element mounted on the laminate; (a) the electrode patterns constituting at least part of inductance elements and/or capacitance elements, which mainly constitute (1) at least one of the first bandpass filter and the balanced-unbalanced conversion circuit, (2) at least one of the first bandpass filter and the splitter or coupler circuit, or (3) at least one of the first bandpass filter, the balanced-unbalanced conversion circuit and the splitter or coupler circuit, and (b) the semiconductor elements constituting (1) the high-frequency switch circuit, or (2) the high-frequency switch circuit and/or the high-frequency power amplifier circuit.

When the second bandpass filter is used, it is preferably constituted by the electrode patterns in the laminate.

Although the inductance elements and/or capacitance elements for the circuits may be constituted by electrode patterns in the laminate or mounted on the laminate, they are preferably disposed in the laminate for the miniaturization of the high-frequency circuit device and the reduction of the number of parts.

The high-frequency switch circuit may be structured as one semiconductor element and mounted on the laminate. Alternatively, the high-frequency switch circuit may be constituted by semiconductor elements, and inductance elements and/or capacitance elements, with at least part of the inductance elements and/or the capacitance elements formed by electrode patterns in the laminate.

A semiconductor element constituting the high-frequency power amplifier circuit may be mounted on the laminate, and its control power source circuit, a matching circuit, etc. may be constituted by inductance elements, capacitance elements and/or resistance elements, with at least part of the inductance elements and/or the capacitance elements formed in the laminate.

In addition to the high-frequency power amplifier circuit, resistance elements may be used and mounted on the laminate.

The communications apparatus of the present invention comprises any one of the above high-frequency circuits, or any one of the above high-frequency circuit devices. The communications apparatus of the present invention are personal computers (PCs), PC peripherals such as PCMCIA cards, printers, hard disk drives and broadband rooters, FAXs, refrigerators, standard-definition televisions (SDTVs), high-definition televisions (HDTVs), digital cameras, digital video cameras, mobile phones, etc.

BRIEF DESCRIPTION OF THE DRAWINGS

FIG. 31($b$) is a development view showing electrode patterns on seventh to twelfth layers in the laminate substrate constituting the high-frequency circuit device according to another embodiment of the present invention.

FIG. 31($c$) is a development view showing electrode patterns on thirteenth to sixteenth layers in the laminate substrate constituting the high-frequency circuit device according to another embodiment of the present invention.

FIG. 34($b$) is a development view showing electrode patterns on seventh to twelfth layers in the laminate substrate constituting the high-frequency circuit device according to a still further embodiment of the present invention.

FIG. 34($c$) is a development view showing electrode patterns on thirteenth to sixteenth layers in the laminate substrate constituting the high-frequency circuit device according to a still further embodiment of the present invention.

DESCRIPTION OF THE BEST MODE OF THE INVENTION

The embodiments of the present invention will be explained in detail referring to the attached drawings, but the structure explained with respect to each embodiment is not restrictive thereto but may be applied to other embodiments, if necessary.

[1] High-Frequency Circuit

Figure 1:
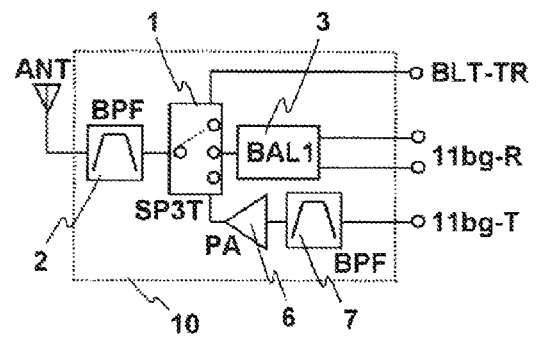
FIG. 1 is a block diagram showing a high-frequency circuit according to one embodiment of the present invention.

FIG. 1 shows the circuit of a communications apparatus usable for both wireless LAN and Bluetooth according to an embodiment of the present invention. Taking for example a case where a first communications system is wireless LAN usable for IEEE 802.11b and/or IEEE 802.11g, and a second communications system is Bluetooth, explanation will be made below. In the figure, the same reference numerals are assigned to parts with the same or similar functions. Accordingly, the same reference numerals do not necessarily mean completely the same parts.

The high-frequency circuit shown in FIG. 1 comprises an antenna ANT capable of transmitting and receiving in wireless LAN and Bluetooth, a high-frequency switch circuit 1 for switching the three-way connection of the antenna ANT to a transmitting circuit 11*bg*-T of wireless LAN, a receiving circuit 11*bg*-R of wireless LAN, and a transmitting/receiving circuit BLT-TR of Bluetooth, a first bandpass filter 2 disposed between the antenna ANT and the high-frequency switch circuit 1, a balanced-unbalanced conversion circuit 3 disposed between the receiving circuit 11*bg*-R of wireless LAN and the high-frequency switch circuit 1, a high-frequency power amplifier circuit 6 disposed between the transmitting circuit 11*bg*-T of wireless LAN and the high-frequency switch circuit 1, and a second bandpass filter 7 disposed between the transmitting circuit 11*bg*-T of wireless LAN and the high-frequency power amplifier circuit 6.

In the high-frequency circuit in this embodiment, a bandpass filter that was necessary between the high-frequency power amplifier circuit 6 and the antenna ANT to suppress harmonics and thermal noise from the high-frequency power amplifier circuit 6, a bandpass filter that was necessary between the antenna ANT and the balanced-unbalanced conversion circuit 3 to suppress signal components other than a received signal to enhance the receiving sensitivity, and a bandpass filter that was necessary between the antenna ANT and the transmitting/receiving circuit BLT-TR of Bluetooth are integrated into one first bandpass filter 2, through which the transmitting and receiving signals of wireless LAN and the transmitting and receiving signals of Bluetooth pass, between the high-frequency switch circuit 1 and the antenna ANT. Thus, it has a simplified circuit structure. To suppress noise generated from the transmitting circuit 11*bg*-T of wireless LAN, a second bandpass filter 7 may be disposed, if necessary, between the transmitting circuit 11*bg*-T of wireless LAN and the high-frequency power amplifier circuit 6. Also, the arrangement of a balanced-unbalanced conversion circuit 3 in a path between the high-frequency switch circuit 1 and the receiving circuit 11*bg*-R of wireless LAN has the circuit balanced to improve the noise resistance of the receiving circuit 11*bg*-R of wireless LAN, without increasing loss in a path between the antenna ANT and the transmitting circuit 11*bg*-T of wireless LAN, and in a path between antenna ANT and the transmitting/receiving circuit BLT-TR of Bluetooth.

Figure 2:
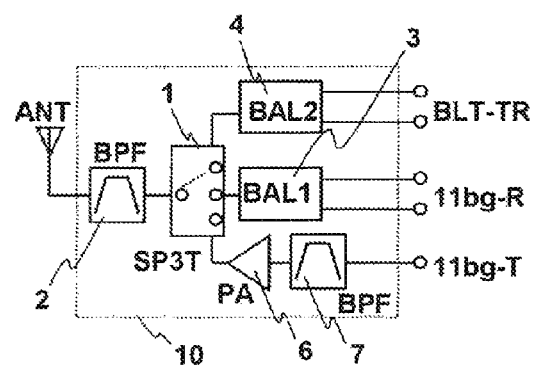
FIG. 2 is a block diagram showing a high-frequency circuit according to another embodiment of the present invention.

To turn the transmitting/receiving circuit BLT-TR of Bluetooth needing small signal-transmitting power to a balanced circuit, without increasing loss in a path for the transmitting signal of wireless LAN between the antenna ANT and the transmitting circuit 11*bg*-T of wireless LAN, a balanced-unbalanced conversion circuit 4 need only be disposed between the transmitting/receiving circuit BLT-TR of Bluetooth and the high-frequency switch circuit 1, as shown in FIG. 2.

Figure 3:
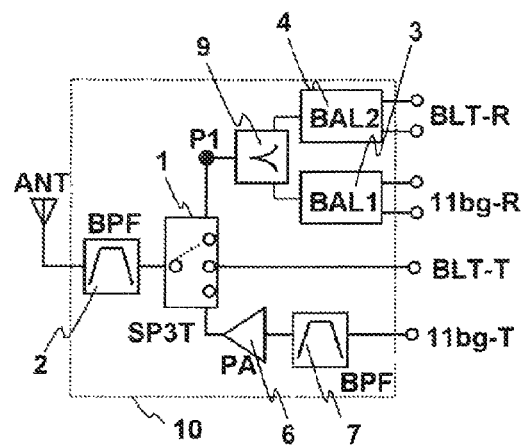
FIG. 3 is a block diagram showing a high-frequency circuit according to a further embodiment of the present invention.

FIG. 3 shows a high-frequency circuit according to another embodiment of the present invention, which may be contained in a communications apparatus usable for both wireless LAN and Bluetooth. This high-frequency circuit comprises a high-frequency switch circuit 1 for switching the three-way connection of an antenna ANT capable of transmitting and receiving signals of wireless LAN and Bluetooth to a transmitting circuit 11*bg*-T of wireless LAN, a transmitting circuit BLT-T of Bluetooth, and a connecting point P1 of a receiving circuit of wireless LAN and a receiving circuit of Bluetooth, a first bandpass filter 2 disposed between the antenna ANT and the high-frequency switch circuit 1, a splitter circuit 9 disposed between the connecting point P1 and the receiving circuit 11*bg*-R of wireless LAN and the receiving circuit BLT-R of Bluetooth, a balanced-unbalanced conversion circuit 3 disposed between the receiving circuit 11*bg*-R of wireless LAN and the splitter circuit 9, a balanced-unbalanced conversion circuit 4 disposed between the receiving circuit BLT-R of Bluetooth and the splitter circuit 9, a high-frequency power amplifier circuit 6 disposed between the transmitting circuit 11*bg*-T of wireless LAN and the high-frequency switch circuit 1, and a second bandpass filter 7 disposed between the transmitting circuit 11*bg*-T of wireless LAN and the high-frequency power amplifier circuit 6.

In the high-frequency circuit shown in FIG. 3, a bandpass filter that was necessary between the high-frequency power amplifier circuit 6 and the antenna ANT to suppress harmonics and thermal noise generated from the high-frequency power amplifier circuit 6, a bandpass filter that was necessary between the antenna ANT and the balanced-unbalanced conversion circuit 3 to suppress signal components other than a received signal to enhance the receiving sensitivity, a bandpass filter that was necessary between the antenna ANT and the balanced-unbalanced conversion circuit 4 to suppress signal components other than a received signal to enhance the receiving sensitivity, and a bandpass filter that was necessary between the transmitting circuit BLT-T of Bluetooth and the antenna ANT to suppress harmonics and thermal noise generated from the transmitting circuit BLT-T of Bluetooth are integrated into one first bandpass filter 2, through which the transmitting and receiving signals of wireless LAN and the transmitting and receiving signals of Bluetooth pass, between the high-frequency switch circuit 1 and the antenna ANT. Thus, it has a simplified circuit structure.

To suppress noise from the transmitting circuit 11*bg*-T of wireless LAN, a second bandpass filter 7 may be disposed between the transmitting circuit 11*bg*-T of wireless LAN and the high-frequency power amplifier circuit 6. Also, the arrangement of the splitter circuit 9 at P1 common to the receiving circuit of wireless LAN and the receiving circuit of Bluetooth makes it possible to receive both signals for wireless LAN and Bluetooth. In addition, when the balanced-unbalanced conversion circuit 3 is arranged between the high-frequency switch circuit 1 and the receiving circuit 11*bg*-R of wireless LAN, and when the balanced-unbalanced conversion circuit 4 is arranged between the high-frequency switch circuit 1 and the receiving circuit BLT-R of Bluetooth, the circuit can be turned to a balanced circuit providing the receiving circuit 11*bg*-R of wireless LAN and the receiving circuit BLT-R of Bluetooth with improved noise resistance, without increasing loss in the path between the antenna ANT and the transmitting circuit 11*bg*-T of wireless LAN, and in the path between the antenna ANT and the transmitting circuit BLT-T of Bluetooth.

Figure 4:
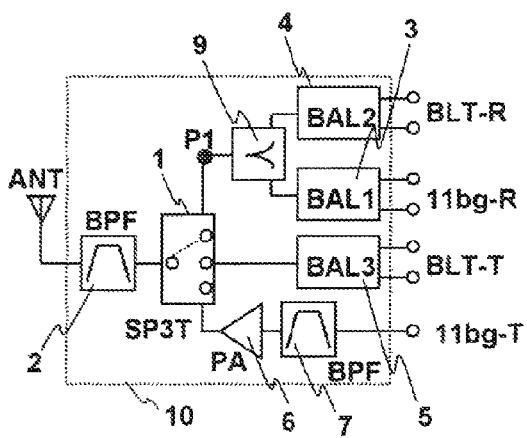
FIG. 4 is a block diagram showing a high-frequency circuit according to a still further embodiment of the present invention.

To turn the transmitting circuit BLT-T of Bluetooth needing small signal-transmitting power to a balanced circuit without increasing loss in a path between the antenna ANT and the transmitting circuit 11*bg*-T of wireless LAN for transmitting signals of wireless LAN, a balanced-unbalanced conversion circuit 5 need only be disposed between the transmitting circuit BLT-T of Bluetooth and the high-frequency switch circuit 1, as shown in FIG. 4.

Figure 5:
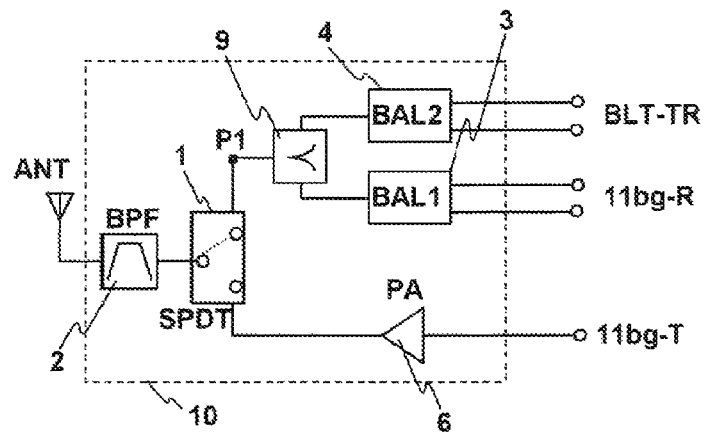
FIG. 5 is a block diagram showing a high-frequency circuit according to a still further embodiment of the present invention.

FIG. 5 shows a high-frequency circuit according to another embodiment of the present invention, which is contained in a communications apparatus usable for both wireless LAN and Bluetooth. This high-frequency circuit comprises an antenna ANT capable of transmitting and receiving signals of wireless LAN and Bluetooth, a high-frequency switch circuit 1 for switching the two-way connection of the antenna ANT to a transmitting circuit 11*bg*-T of wireless LAN, and a connecting point P1 of a receiving circuit 11*bg*-R of wireless LAN and a transmitting/receiving circuit BLT-TR of Bluetooth, a first bandpass filter 2 disposed between the antenna ANT and the high-frequency switch circuit 1, and a splitter circuit 9 disposed between the connecting point P1 and the receiving circuit 11*bg*-R of wireless LAN and the transmitting/receiving circuit BLT-TR of Bluetooth. A balanced-unbalanced conversion circuit 3 is disposed between the receiving circuit 11*bg*-R of wireless LAN and the splitter circuit 9, and a balanced-unbalanced conversion circuit 4 is disposed the transmitting/receiving circuit BLT-TR of Bluetooth and the splitter circuit 9. A high-frequency power amplifier circuit 6 is disposed between the transmitting circuit 11*bg*-T of wireless LAN and the high-frequency switch 1.

In the high-frequency circuit shown in FIG. 5, a bandpass filter that was necessary between the high-frequency power amplifier circuit 6 and the antenna ANT to suppress harmonics and thermal noise generated from the high-frequency power amplifier circuit 6, a bandpass filter that was necessary between the antenna ANT and the balanced-unbalanced conversion circuit 3 to suppress signal components other than a received signal to enhance the receiving sensitivity, and a bandpass filter that was necessary between the antenna ANT and the transmitting/receiving circuit BLT-TR of Bluetooth are integrated into the first bandpass filter 2, through which the transmitting signal of wireless LAN, the received signal of wireless LAN and the transmitting/receiving signals of Bluetooth pass, between the high-frequency switch 1 and the antenna ANT. Thus, it has a simplified circuit structure.

The arrangement of the balanced-unbalanced conversion circuit 3 between the splitter circuit 9 and the receiving circuit 11*bg*-R of wireless LAN is adapted to a balanced circuit for improving the noise resistance of the receiving circuit 11*bg*-R of wireless LAN, without increasing loss in a path between the antenna ANT and the transmitting circuit 11*bg*-T of wireless LAN.

To turn the transmitting/receiving circuit BLT-TR of Bluetooth needing a small signal-transmitting power to a balanced circuit without increasing loss in path a between the antenna ANT and the transmitting circuit 11*bg*-T of wireless LAN, a balanced-unbalanced conversion circuit 4 need only be disposed between the transmitting/receiving circuit BLT-TR of Bluetooth and the splitter circuit 9.

Because the high-frequency circuit shown in FIG. 5 is branched by the splitter circuit 9 to the receiving circuit 11*bg*-R of wireless LAN and the transmitting/receiving circuit BLT-TR of Bluetooth, it can simultaneously receive signals of wireless LAN and Bluetooth. A coupler circuit may be used in place of the splitter circuit 9. Even when the coupler circuit is used, the signals of wireless LAN and Bluetooth can be simultaneously received. In the case of using the coupler circuit, a distribution ratio of the receiving circuit 11*bg*-R of wireless LAN to the transmitting/receiving circuit BLT-TR of Bluetooth can be changed to, for instance, 5:1 or 10:1, to properly set the ratio of the signal of Bluetooth to the signal of wireless LAN. For instance, the minimum receiving sensitivity at a short distance is −70 dBm in Bluetooth, much lower than −65 dBm in wireless LAN. Accordingly, the simultaneous receiving of the signal of wireless LAN and the signal of Bluetooth can be efficient conducted by distributing less signals to the receiving circuit of Bluetooth needing only small power and more signals to the receiving circuit of wireless LAN needing large power, using the coupler circuit.

Figure 6:
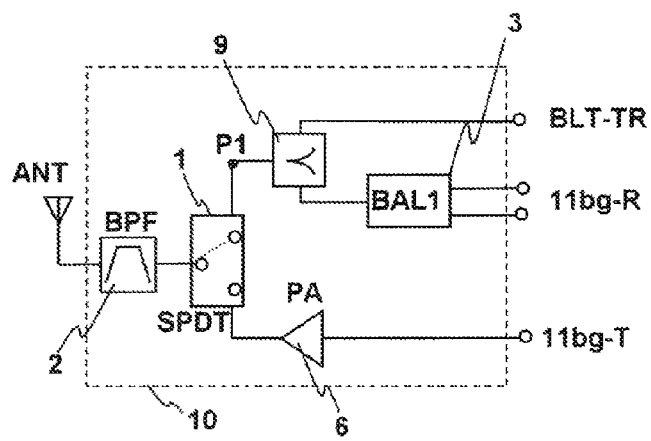
FIG. 6 is a block diagram showing a high-frequency circuit according to a still further embodiment of the present invention.
Figure 7:
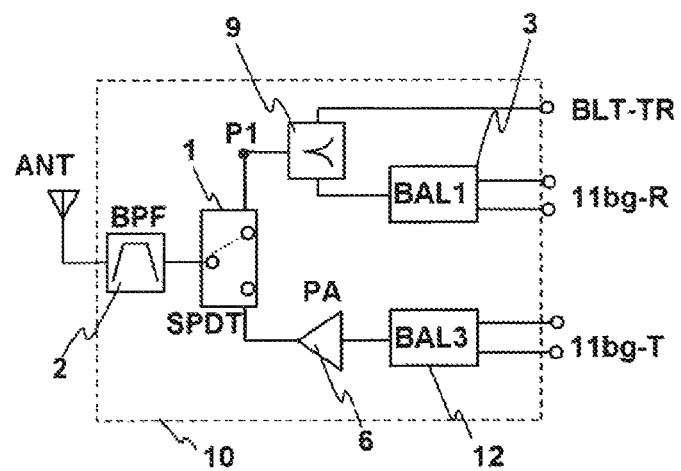
FIG. 7 is a block diagram showing a high-frequency circuit according to a still further embodiment of the present invention.
Figure 8:
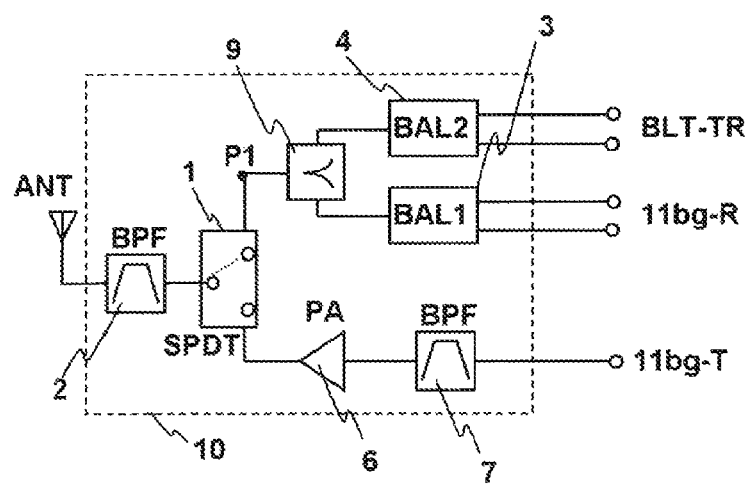
FIG. 8 is a block diagram showing a high-frequency circuit according to a still further embodiment of the present invention.

The balanced-unbalanced conversion circuit 4 between the transmitting/receiving circuit BLT-TR of Bluetooth and the splitter circuit 9 may be omitted as shown in FIG. 6, and a balanced-unbalanced conversion circuit 12 may be disposed between the transmitting circuit 11*bg*-T of wireless LAN and the high-frequency power amplifier circuit 6 as shown in FIG. 7. The balanced-unbalanced conversion circuit 12 causes a terminal for the transmitting circuit 11*bg*-T of wireless LAN to act as a balance terminal, thereby making it adaptable to a balanced circuit for the improvement of noise resistance. As shown in FIG. 8, a bandpass filter 7 may be disposed between the transmitting circuit 11*bg*-T of wireless LAN and the high-frequency power amplifier circuit 6. With the band filter 7, local signal noise generated from the transmitting circuit of RF-IC for wireless LAN can be removed. It is noted that the addition and combination of these circuit elements can be properly modified.

Figure 9:
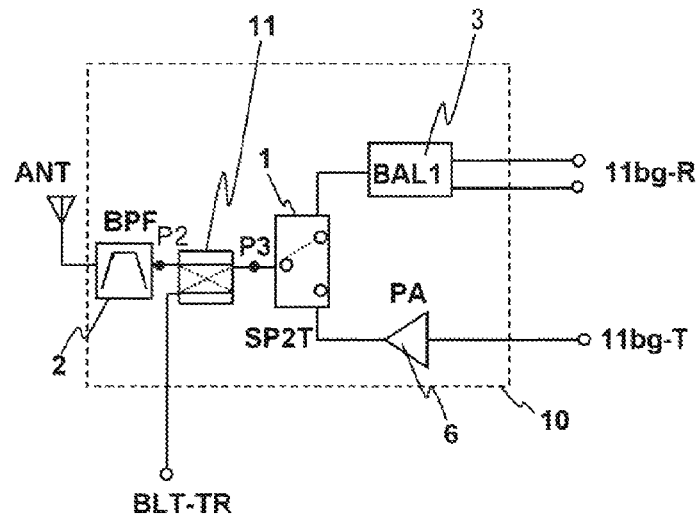
FIG. 9 is a block diagram showing a high-frequency circuit according to a still further embodiment of the present invention.

FIG. 9 shows a high-frequency circuit according to a still further embodiment of the present invention, which is contained in a communications apparatus usable for both wireless LAN and Bluetooth. This high-frequency circuit comprises an antenna ANT capable of transmitting and receiving signals of wireless LAN and Bluetooth, a high-frequency switch circuit 1 for switching the two-way connection of the antenna ANT to transmitting and receiving circuits 11*bg*-T, 11*bg*-R of wireless LAN, a first bandpass filter 2 disposed between the antenna ANT and the high-frequency switch circuit 1, a coupler circuit 11 disposed between the high-frequency switch circuit 1 and the first bandpass filter 2 and connected to a transmitting/receiving circuit BLT-TR of Bluetooth, a balanced-unbalanced conversion circuit 3 disposed between the receiving circuit 11*bg*-R of wireless LAN and the high-frequency switch circuit 1, and a high-frequency power amplifier circuit 6 disposed between the transmitting circuit 11*bg*-T of wireless LAN and the high-frequency switch circuit 1.

In the high-frequency circuit shown in FIG. 9, a bandpass filter that was necessary between the high-frequency power amplifier circuit 6 and the antenna ANT to suppress harmonics and thermal noise generated from the high-frequency power amplifier circuit 6, a bandpass filter that was necessary between the antenna ANT and the balanced-unbalanced conversion circuit 3 to suppress signal components other than a received signal to enhance the receiving sensitivity, and a bandpass filter that was necessary between the antenna ANT and the transmitting/receiving circuit BLT-TR of Bluetooth are integrated into one first bandpass filter 2 between the high-frequency switch 1 and the antenna ANT. Thus, it has a simplified circuit structure.

The arrangement of the balanced-unbalanced conversion circuit 3 between the high-frequency switch circuit 1 and the receiving circuit 11*bg*-R of wireless LAN makes the receiving circuit 11*bg*-R adaptable to a balanced circuit for improving the noise resistance of the receiving circuit 11*bg*-R of wireless LAN, without increasing loss in a path between the antenna ANT and the transmitting circuit 11*bg*-T of wireless LAN.

Although the coupler circuit 11 is disposed between the high-frequency switch circuit 1 and the first bandpass filter 2 in FIG. 9, it may be disposed between the antenna ANT and the first bandpass filter 2, and a splitter circuit may be used in place of the coupler circuit 11. Thus, the arrangement of a circuit branching to the transmitting/receiving circuit BLT-TR of Bluetooth in an antenna top portion upstream of the high-frequency switch circuit 1 makes it possible to simultaneously perform the transmitting and receiving of signals for both communications systems of wireless LAN and Bluetooth, without increasing the number of antennas. The connection of the antenna ANT to the transmitting/receiving circuit BLT-TR of Bluetooth does not need a new switch circuit, thereby avoiding increase in the number of switch control circuits. Further, in the case of using the coupler circuit, as described above, the ratio of the signal of Bluetooth to the signal of wireless LAN can be properly set by changing the distribution ratio of the circuit of wireless LAN to the circuit of Bluetooth. Because the minimum receiving sensitivity is −70 dBm in Bluetooth, much lower than −65 dBm in wireless LAN, the coupler circuit can distribute less signal to the circuit of Bluetooth needing only small power and more signal to the circuit of wireless LAN needing large power to conduct efficient transmission and receiving of signals.

Figure 10:
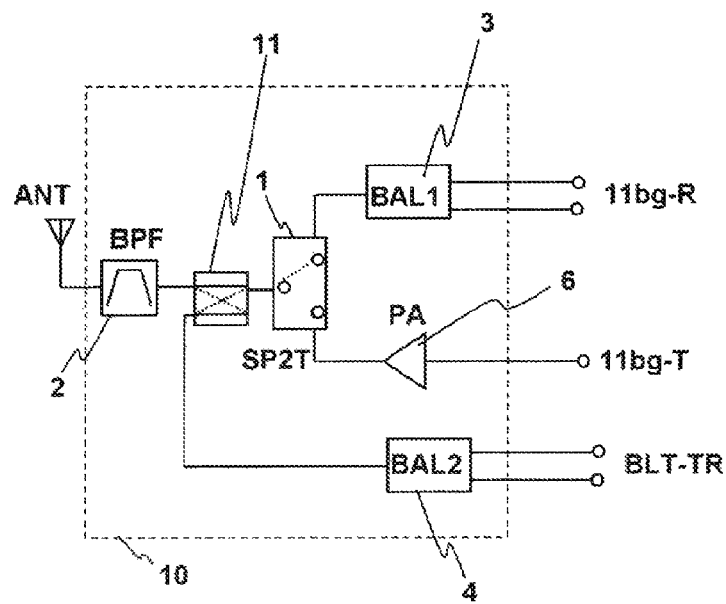
FIG. 10 is a block diagram showing a high-frequency circuit according to a still further embodiment of the present invention.

When the transmitting/receiving circuit BLT-TR of Bluetooth needing small signal-transmitting power is made to a balanced circuit, a balanced-unbalanced conversion circuit 4 may be disposed between the transmitting/receiving circuit BLT-TR of Bluetooth and the coupler circuit 11 as shown in FIG. 10.

When a balanced-unbalanced conversion circuit is disposed between the transmitting circuit 11$bg$-T of wireless LAN and the high-frequency power amplifier circuit 6, and when a terminal for the transmitting circuit 11$bg$-T of wireless LAN is used as a balance terminal, a balanced circuit with improved noise resistance can be obtained. Also, when a bandpass filter is disposed between the transmitting circuit 11$bg$-T of wireless LAN and the high-frequency power amplifier circuit 6, noise from the transmitting circuit 11$bg$-T of wireless LAN can be removed. It is noted that the addition and combination of these circuit elements may be properly modified.

Figure 11:
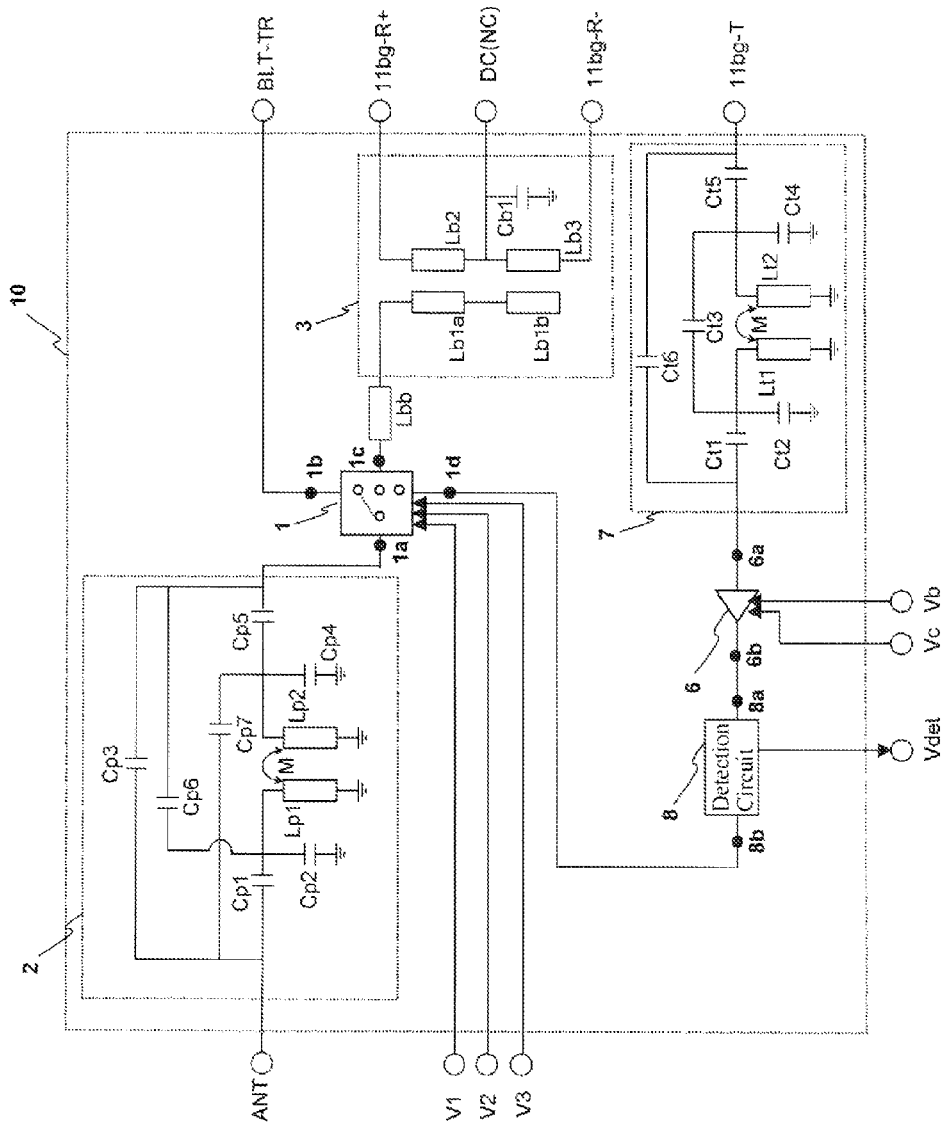
FIG. 11 is a view showing the equivalent circuit of a high-frequency circuit according to an embodiment of the present invention.

FIG. 11 shows the equivalent circuit of a high-frequency circuit of FIG. 1. The first bandpass filter 2 is disposed between the antenna port ANT and the high-frequency switch circuit 1, and constituted by magnetically coupled inductance elements Lp1, Lp2 and capacitance elements Cp1, Cp2, Cp3, Cp4, Cp5, Cp6, Cp1. The first bandpass filter 2 attenuates harmonics generated from the high-frequency power amplifier 6 or the high-frequency switch circuit 1 when transmitting, and attenuates signals outside the frequencies used for receiving in wireless LAN and Bluetooth when receiving.

The balanced-unbalanced conversion circuit 3 is connected to the high-frequency switch circuit 1 via a matching circuit Lbb. The matching circuit Lbb, which is necessary for matching between the bandpass filter 2 and the balanced-unbalanced conversion circuit 3, is not restricted to the depicted arrangement, but may be disposed between the high-frequency switch circuit 1 and the bandpass filter 2. Part of the balanced-unbalanced conversion circuit 3 on the side of the high-frequency switch circuit 1 is an unbalanced circuit constituted by inductance elements Lb1$a$, Lb1$b$, and the other part of the balanced-unbalanced conversion circuit 3 on the side of the receiving circuits 11$bg$-R+, 11$bg$-R− of wireless LAN is a balanced circuit constituted by inductance elements Lb2, Lb3 and a capacitance element Cb1. Signals ideally having the same amplitude with 180° phase difference are output from the receiving circuits 11$bg$-R+ and 11$bg$-R− of wireless LAN. A capacitance element Cb1 which looks short-circuited at a high frequency is disposed between the connecting point of the inductance elements Lb2 and Lb3 and the ground, DC voltage is applied from a DC(NC) port, and DC voltage can be output from a 11$bg$-R+port and a 11$bg$-R− port. The balanced-unbalanced conversion circuit 3 may be provided with an impedance-converting function.

Disposed between the high-frequency switch circuit 1 and the transmitting circuit 11$bg$-T of wireless LAN are a detection circuit 8 for monitoring power output from a high-frequency power amplifier circuit 6, the high-frequency power amplifier circuit 6 for amplifying the power of the transmitting signal from the transmitting circuit 11$bg$-T of wireless LAN, and a second bandpass filter 7 comprising magnetically coupled inductance elements Lt1, Lt2 and capacitance elements Ct1, Ct2, Ct3, Ct4, Ct5, Ct6, in this order from the side of the high-frequency switch circuit 1. The second bandpass filter 7 attenuates signals outside the frequencies of the transmitting signal of wireless LAN inputted from the transmitting circuit 11$bg$-T of wireless LAN.

FIGS. 12-16 exemplify the equivalent circuits of the high-frequency switches 1. These high-frequency switch circuits 1 are depicted by usual symbols with their explanation omitted. They are mainly constituted by switching elements such as field-effect transistors (FETs), diodes, etc., properly with inductance elements including transmission lines, and capacitance elements.

Figure 12:
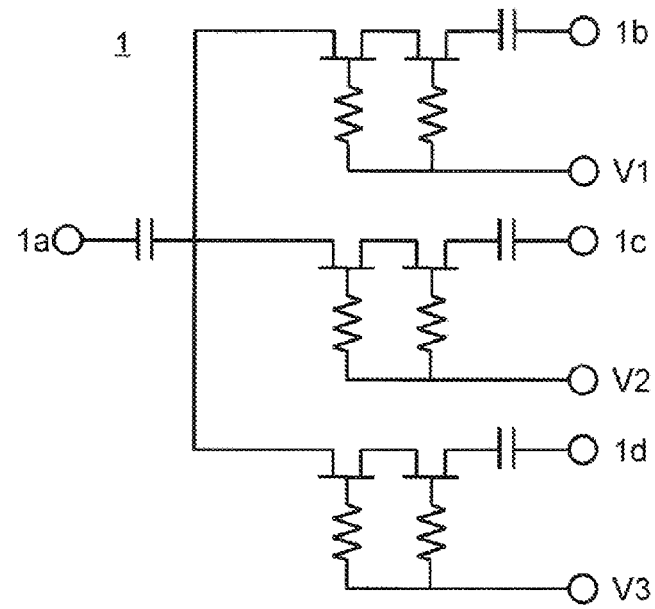
FIG. 12 is a view showing one example of the equivalent circuits of high-frequency switch circuits used in the present invention.
Figure 13:
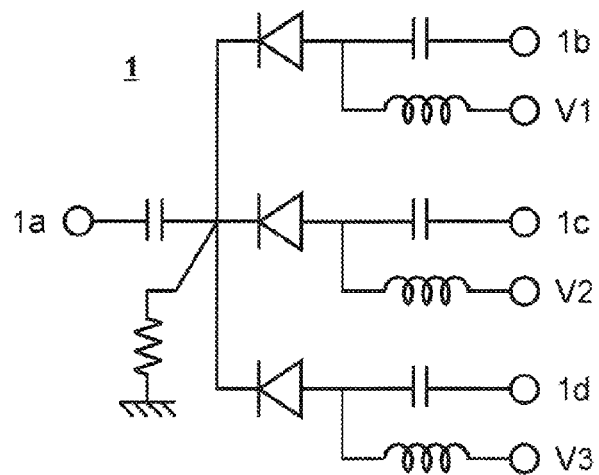
FIG. 13 is a view showing another example of the equivalent circuits of high-frequency switch circuits used in the present invention.

In the high-frequency switch circuits 1 shown in FIGS. 12 and 13, as shown in Table 1, ports are connected by voltage applied to the control terminals V1, V2, V3. In Table 1, "High" represents voltage in a range of 2.5-4 V, and "Low" represents voltage in a range of 0-0.5 V.

TABLE 1

| Connection Mode | V1 | V2 | V3 | Between Ports 1a-1b | Between Ports 1a-1c | Between Ports 1a-1d |
|---|---|---|---|---|---|---|
| 1 | High | Low | Low | Connected | Disconnected | Disconnected |
| 2 | Low | High | Low | Disconnected | Connected | Disconnected |
| 3 | Low | Low | High | Disconnected | Disconnected | Connected |

Figure 14:
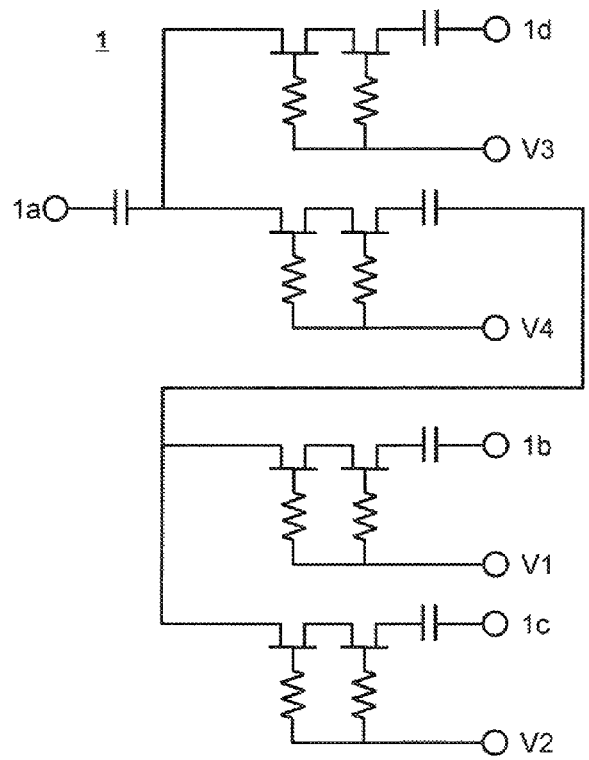
FIG. 14 is a view showing a further example of the equivalent circuits of high-frequency switch circuits used in the present invention.
Figure 15:
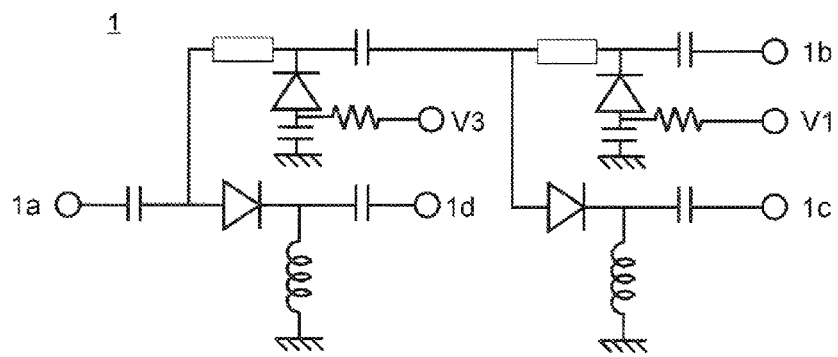
FIG. 15 is a view showing a still further example of the equivalent circuits of high-frequency switch circuits used in the present invention.
Figure 16:
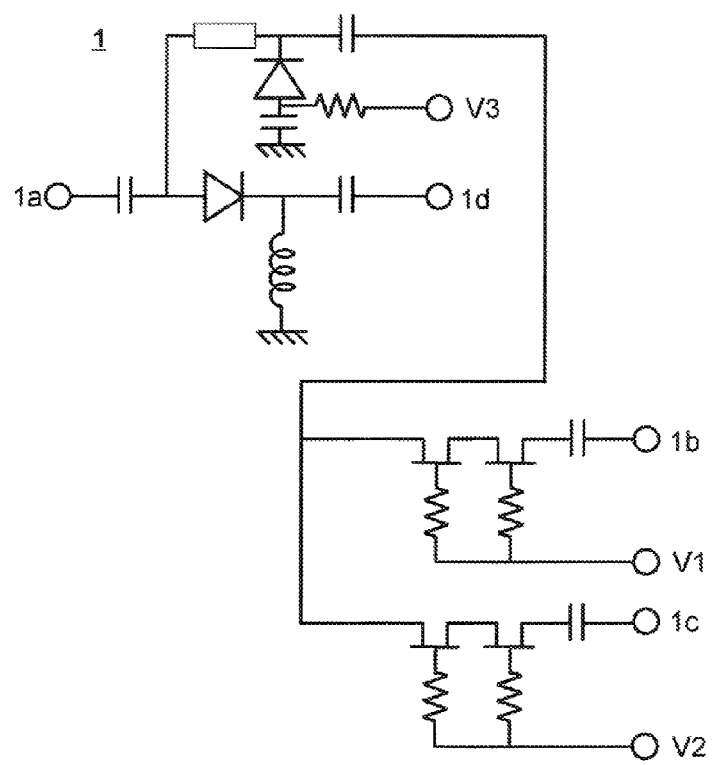
FIG. 16 is a view showing a still further example of the equivalent circuits of high-frequency switch circuits used in the present invention.

When isolation is insufficient between the transmitting circuit 11$bg$-T of wireless LAN and the transmitting/receiving circuit BLT-TR of Bluetooth in the high-frequency switch circuits shown in FIGS. 12 and 13, high-frequency switch circuits for switching two paths may be connected in series to improve the isolation, thereby constituting the high-frequency switch circuits 1. Examples of such high-frequency switch circuits 1 are shown in FIGS. 14-16. In the high-frequency switch circuit 1 shown in FIG. 14, ports are connected by voltage applied to control terminals V1-V4 as shown in Table 2. In the high-frequency switch circuit 1 shown in FIG. 15, ports are connected by voltage applied to control terminals V1 and V3 as shown in Table 3. In the high-frequency switch circuit 1 shown in FIG. 16, ports are connected by voltage applied to control terminals V1, V2 and V3 as shown in Table 4.

TABLE 2

| Connection Mode | V1 | V2 | V3 | V4 | Between Ports 1a-1b | Between Ports 1a-1c | Between Ports 1a-1d |
|---|---|---|---|---|---|---|---|
| 1 | High | Low | Low | High | Connected | Disconnected | Disconnected |
| 2 | Low | High | Low | High | Disconnected | Connected | Disconnected |
| 3 | Low | High | High | Low | Disconnected | Disconnected | Connected |

TABLE 3

| Connection Mode | V1 | V3 | Between Ports 1a-1b | Between Ports 1a-1c | Between Ports 1a-1d |
|---|---|---|---|---|---|
| 1 | Low | Low | Connected | Disconnected | Disconnected |
| 2 | High | Low | Disconnected | Connected | Disconnected |
| 3 | High | High | Disconnected | Disconnected | Connected |

TABLE 4

| Connection Mode | V1 | V2 | V3 | Between Ports 1a-1b | Between Ports 1a-1c | Between Ports 1a-1d |
|---|---|---|---|---|---|---|
| 1 | High | Low | Low | Connected | Disconnected | Disconnected |
| 2 | Low | High | Low | Disconnected | Connected | Disconnected |
| 3 | Low | High | High | Disconnected | Disconnected | Connected |

Figure 17:
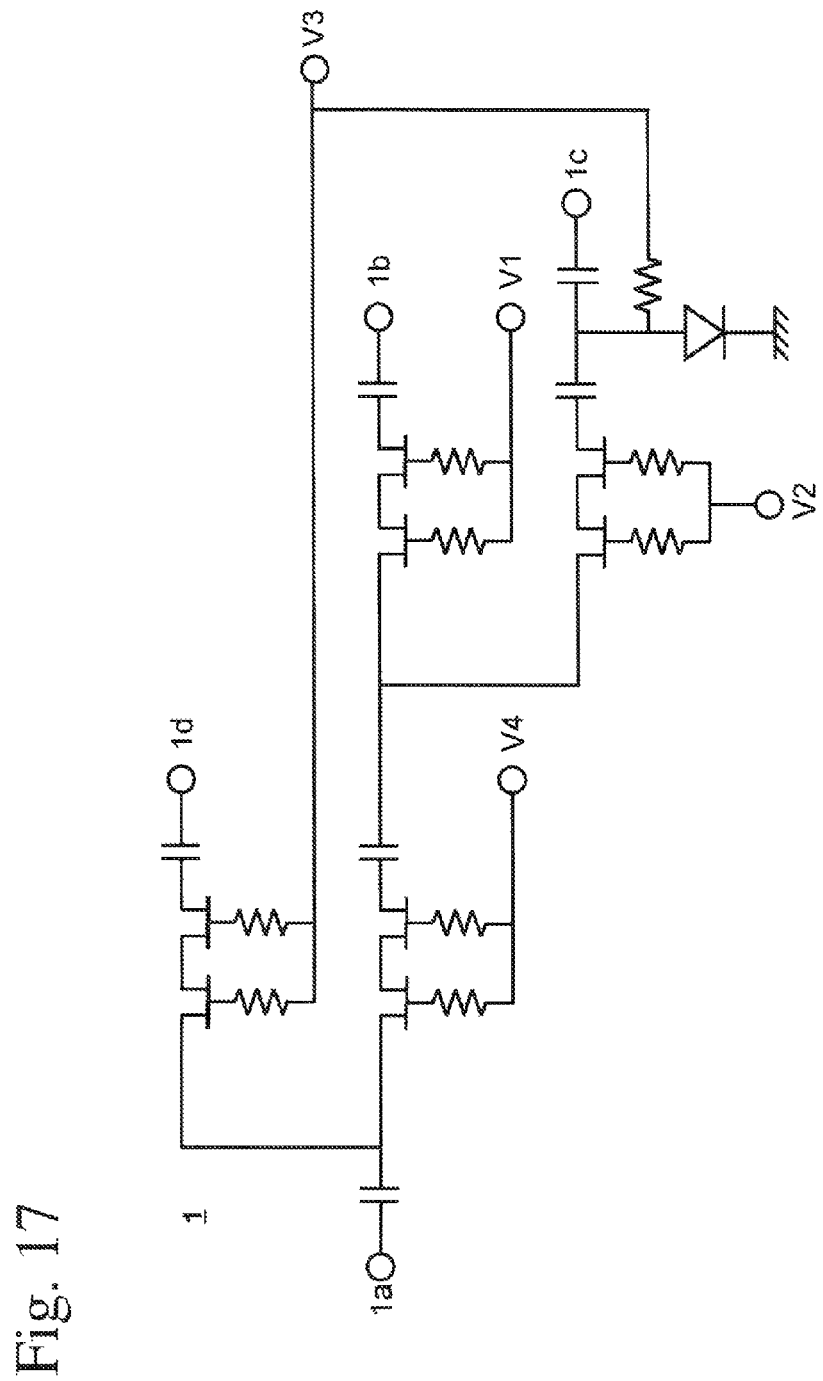
FIG. 17 is a view showing a still further example of the equivalent circuits of high-frequency switch circuits used in the present invention.

When isolation is insufficient between the transmitting circuit 11bg-T of wireless LAN and the receiving circuit 11bg-R of wireless LAN in the high-frequency switch circuits 1 shown in FIGS. 14-16, switch circuits for turning on or off one path may be disposed in series or in a grounded manner in a path between a terminal 1c connected to the receiving circuit 11bg-R of wireless LAN and a terminal 1a connected to the antenna to improve the isolation. FIG. 17 shows an example in which a PIN diode is connected between a terminal 1c and the ground. In the high-frequency switch circuit 1 shown in FIG. 17, ports are connected by voltage applied to control terminals V1, V2, V3, V4 as shown in Table 2.

Figure 18:
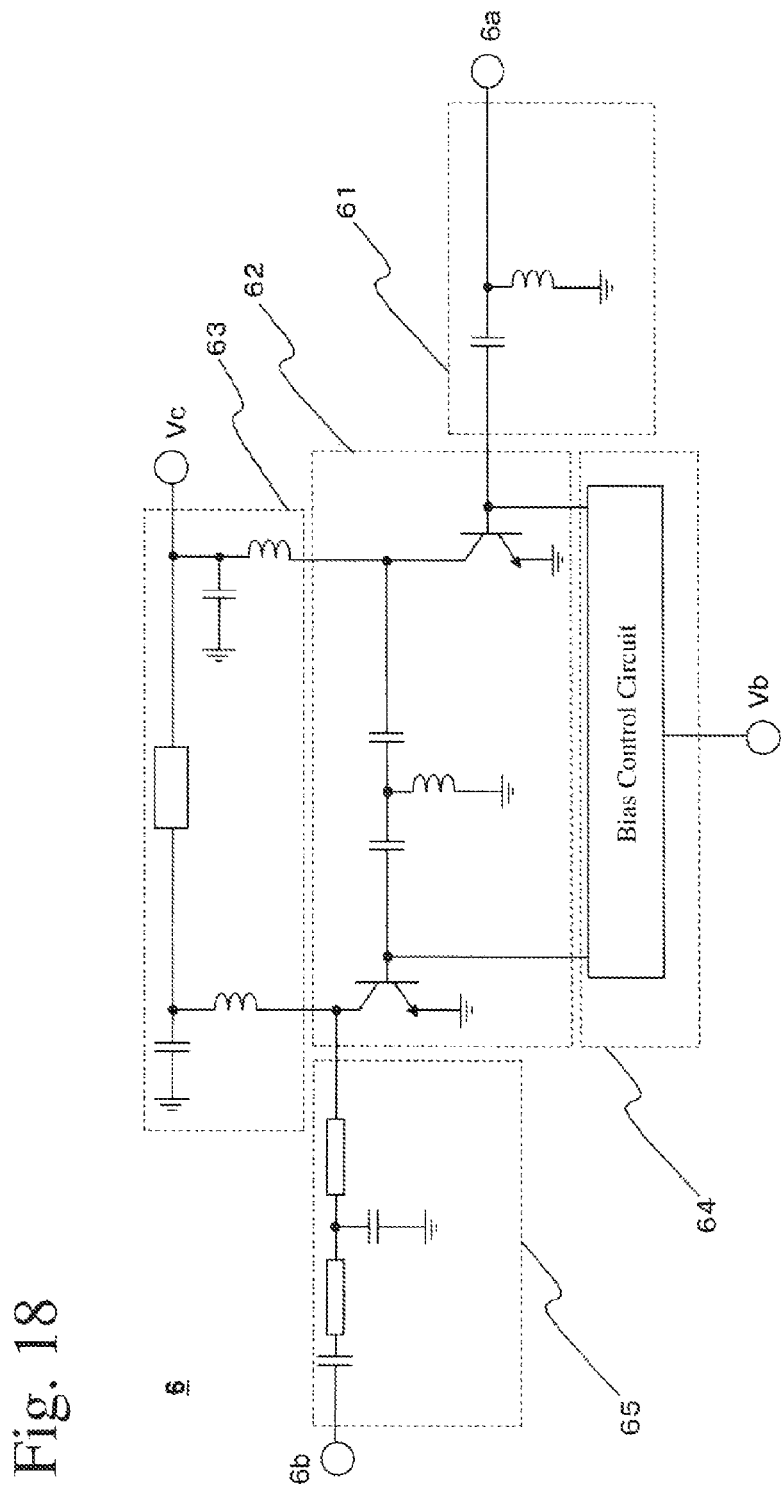
FIG. 18 is a view showing one example of the equivalent circuits of high-frequency power amplifier circuits used in the present invention.

FIG. 18 shows one example of the equivalent circuits of the high-frequency power amplifier circuit 6 connected between the transmitting circuit 11bg-T of wireless LAN and the detection circuit 8. The high-frequency power amplifier circuit 6 comprises an input-matching circuit 61, a power amplifier circuit 62 having two-stage transistors, a voltage supply circuit 63 for supplying a constant voltage, a bias control circuit 64 for controlling the output power of the high-frequency power amplifier circuit 6, and an output-matching circuit 65. Inductance elements and capacitance elements are used in the circuits 61-65. The circuits 61-65 may be constituted by a microwave monolithic integrated circuit (MMIC).

Figure 19:
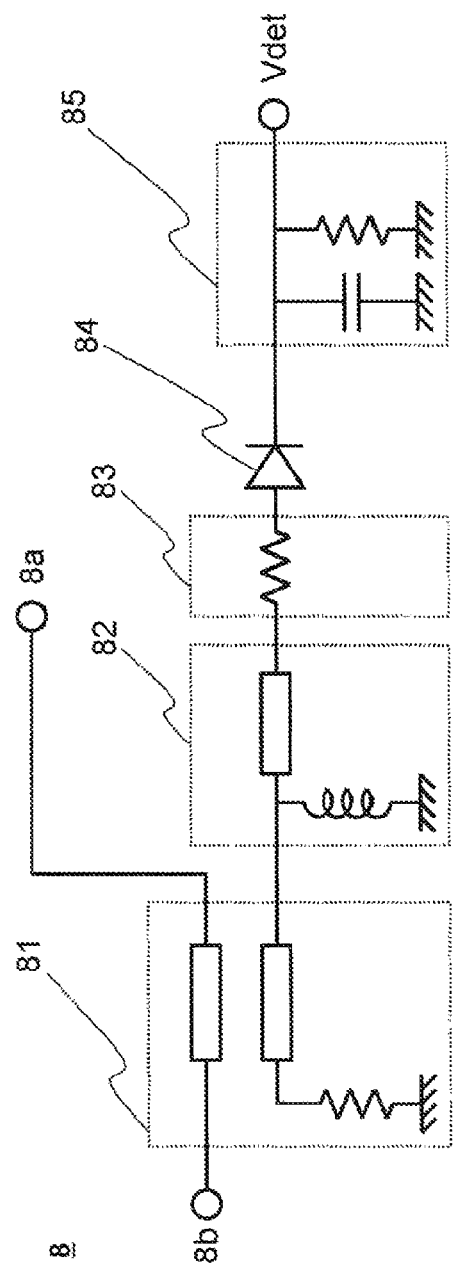
FIG. 19 is a view showing one example of the equivalent circuits of detection circuits used in the present invention.

FIG. 19 shows one example of the equivalent circuits of the detection circuit 8 connected between the high-frequency switch circuit 1 and the high-frequency power amplifier circuit 6. The detection circuit 8 comprises a directional coupler 81 comprising a main line, a sub-line and a resistance element, a matching circuit 82 comprising a grounded inductance element and a phase circuit, a resistance element 83, a Schottky diode 84, and a voltage-smoothing circuit 85 comprising a resistance element and a capacitor element. The coupler 81 may be constituted by capacitors, and the matching circuit 82 may be constituted by a phase circuit. DC voltage corresponding to the output power of the high-frequency power amplifier circuit 6 is output from Vdet. The detection circuit 8 may be integrated with the high-frequency power amplifier circuit 6.

Figure 20:
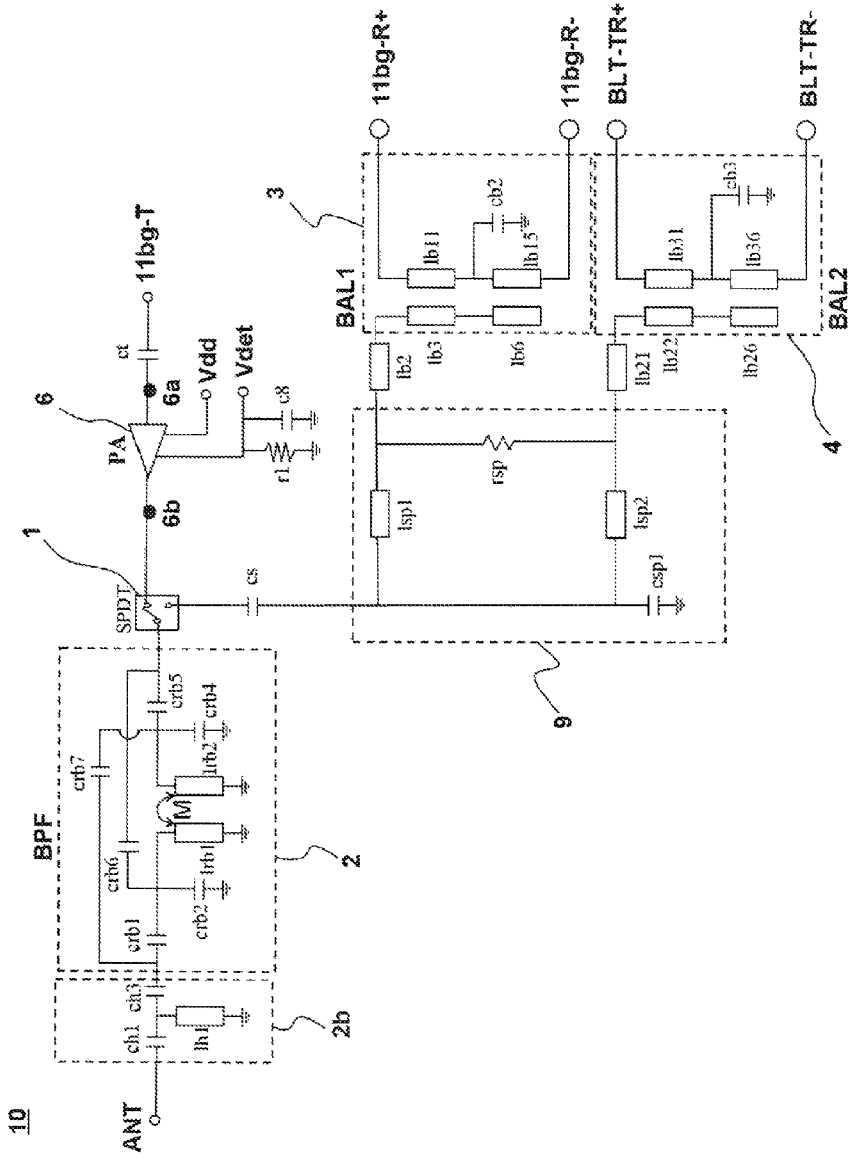
FIG. 20 is a view showing one example of the equivalent circuit of a high-frequency circuit device according to an embodiment of the present invention.

FIG. 20 shows the equivalent circuit of a portion 10 (corresponding to the high-frequency circuit device) encircled by a broken line in the high-frequency circuit shown in FIG. 5. The first bandpass filter 2 disposed between the antenna port ANT and the high-frequency switch circuit 1 comprises magnetically coupled inductance elements lrb1, lrb2, and capacitance elements crb1, crb2, crb4, crb5, crb6, crb7. Connected to the first bandpass filter 2 on the side of the antenna port ANT is a highpass filter 2b comprising an inductance element lh1 and capacitance elements ch1, ch3. The highpass filter 2b, which attenuates signals outside the passband of the first bandpass filter 2, may be regarded as a bandpass filter comprising the highpass filter 2b and the first bandpass filter 2. The highpass filter 2b and the first bandpass filter 2 attenuate harmonics generated from the high-frequency power amplifier 6 or the high-frequency switch circuit 1 during transmission, and attenuate signals outside the frequencies used in wireless LAN and Bluetooth during receiving.

The bandpass filter 2 is connected to the high-frequency switch circuit 1 of SPDT. The first path of the high-frequency switch circuit 1 is connected to the high-frequency power amplifier circuit 6, which is connected to the transmitting circuit 11bg-T of wireless LAN via a capacitance element ct.

The second path of the high-frequency switch circuit 1 is connected to the splitter circuit 9 comprising inductance elements lsp1, lsp2, a resistance element rsp and a capacitance element csp1, via a capacitance element cs. The splitter circuit 9 distributes signals to the receiving circuit 11bg-R of wireless LAN and the transmitting/receiving circuit BLT-TR of Bluetooth. Connected via the matching circuit lb2 to the splitter circuit 9 on the side of the receiving circuit 11bg-R of wireless LAN is a balanced-unbalanced conversion circuit 3 having balance terminals 11bg-R+, 11bg-R−. The balanced-unbalanced conversion circuit 3 comprises inductance elements lb3, lb6, lb11, lb15 and a capacitance element cb2. A part of the balanced-unbalanced conversion circuit 3 on the side of the receiving circuit 11bg-R of wireless LAN is a balanced circuit, balance terminals 11bg-R+, 11bg-R− of which output signals ideally having the same amplitude with a 180° phase difference. Disposed between the connecting point of the inductance elements lb11 and lb15 and the ground is a capacitance element cb2, which looks short-circuited in high frequencies. However, a DC port for applying DC voltage to the connecting point may output DC voltage from its balance terminals 11bg-R+, 11bg-R−. The balanced-unbalanced conversion circuit 3 may be provided with an impedance-converting function.

Connected via the matching circuit lb21 to the splitter circuit 9 on the side of the transmitting/receiving circuit BLT-TR of Bluetooth is a balanced-unbalanced conversion circuit 4 having balance terminals BLT-TR+, BLT-TR−. The balanced-unbalanced conversion circuit 4 comprises inductance elements lb22, lb26, lb31, lb36 and a capacitance element cb3.

Figure 21:
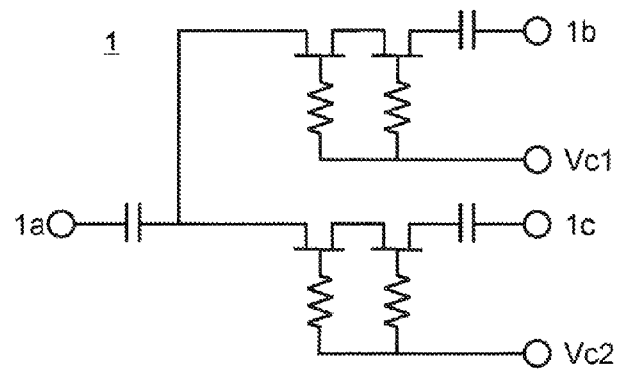
FIG. 21 is a view showing one example of the equivalent circuits of high-frequency switches used in the present invention.
Figure 22:
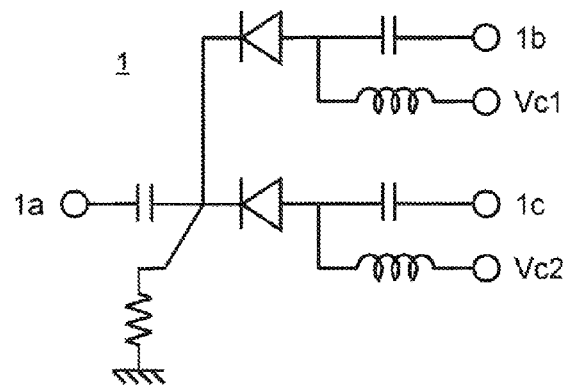
FIG. 22 is a view showing another example of the equivalent circuits of high-frequency switches used in the present invention.
Figure 23:
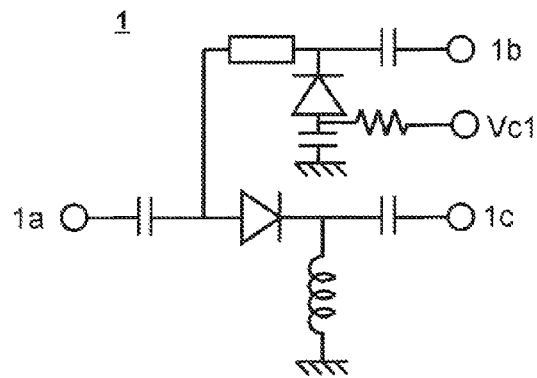
FIG. 23 is a view showing another example of the equivalent circuits of high-frequency switches used in the present invention.

FIGS. 21-23 show the equivalent circuits of the high-frequency switch circuits 1. These high-frequency switches 1 are depicted by usual symbols, with their explanation omitted. They comprise switching elements such as field-effect transistors (FET), diodes, etc. as main components, with proper inductance elements including transmitting lines, and capacitance elements.

In the high-frequency switches 1 shown in FIGS. 21 and 22, ports are connected by voltage applied from control terminals Vc1, Vc2, as shown in Table 5. In the high-frequency switch 1 shown in FIG. 23, ports are connected by voltage applied from a control terminal Vc1, as shown in Table 6. In Tables 5 and 6, "High" represents voltage in a range of 2.5-4 V, and "Low" represents voltage in a range of 0-0.5 V.

TABLE 5

| Connection Mode | Vc1 | Vc2 | Between Ports 1a-1b | Between Ports 1a-1c |
|---|---|---|---|---|
| 1 | High | Low | Connected | Disconnected |
| 2 | Low | High | Disconnected | Connected |

TABLE 6

| Connection Mode | Vc1 | Between Ports 1a-1b | Between Ports 1a-1c |
|---|---|---|---|
| 1 | Low | Connected | Disconnected |
| 2 | High | Disconnected | Connected |

Figure 24:
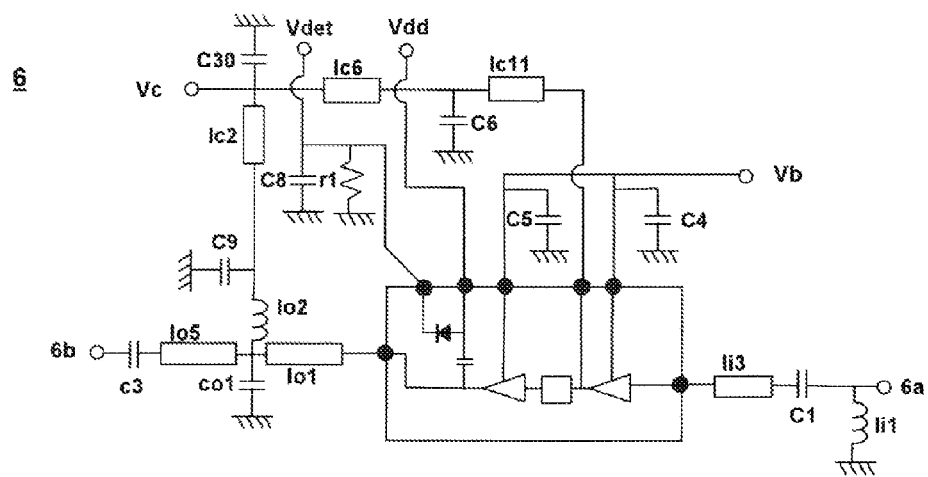
FIG. 24 is a view showing one example of the equivalent circuits of high-frequency power amplifier circuits used in the present invention.

FIG. 24 shows one example of the equivalent circuits of the high-frequency power amplifier circuit 6. The high-frequency power amplifier circuit 6 comprises an input-matching circuit, a power amplifier circuit, a voltage supply circuit, a bias control circuit, an output-matching circuit, and a detection circuit. DC voltage corresponding to the output power of the high-frequency power amplifier circuit 6 is output from Vdet terminal.

Figure 25:
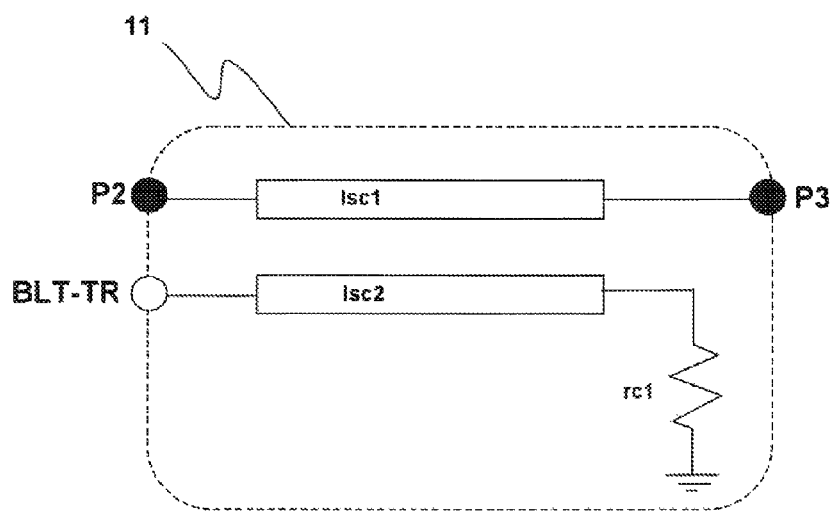
FIG. 25 is a view showing one example of the equivalent circuits of coupler circuits used in the present invention.

In the equivalent circuit of a high-frequency circuit shown in FIG. 9, the high-frequency switch circuit 1, the high-frequency power amplifier circuit 6, and the balanced-unbalanced conversion circuit 3 may be those already explained. Thus, the equivalent circuit of the coupler circuit 11 will be explained below. FIG. 25 shows one example of the coupler circuit 11. The coupler circuit 11 comprises a main line lsc1 disposed between a port P3 connected to the high-frequency switch circuit 1 and a port P2 connected to the filter circuit 2, and a sub-line lsc2 coupled to the main line lsc1. The sub-line lsc2 has one end connected to the transmitting/receiving circuit BLT-TR of Bluetooth, and the other end connected to a ground electrode via a resistor rc1. The balanced-unbalanced conversion circuit 4 having the already explained equivalent circuit may be connected between the coupler circuit 11 and the transmitting/receiving circuit BLT-TR of Bluetooth, as shown in FIG. 10.

[2] High-Frequency Circuit Device

Figure 26:
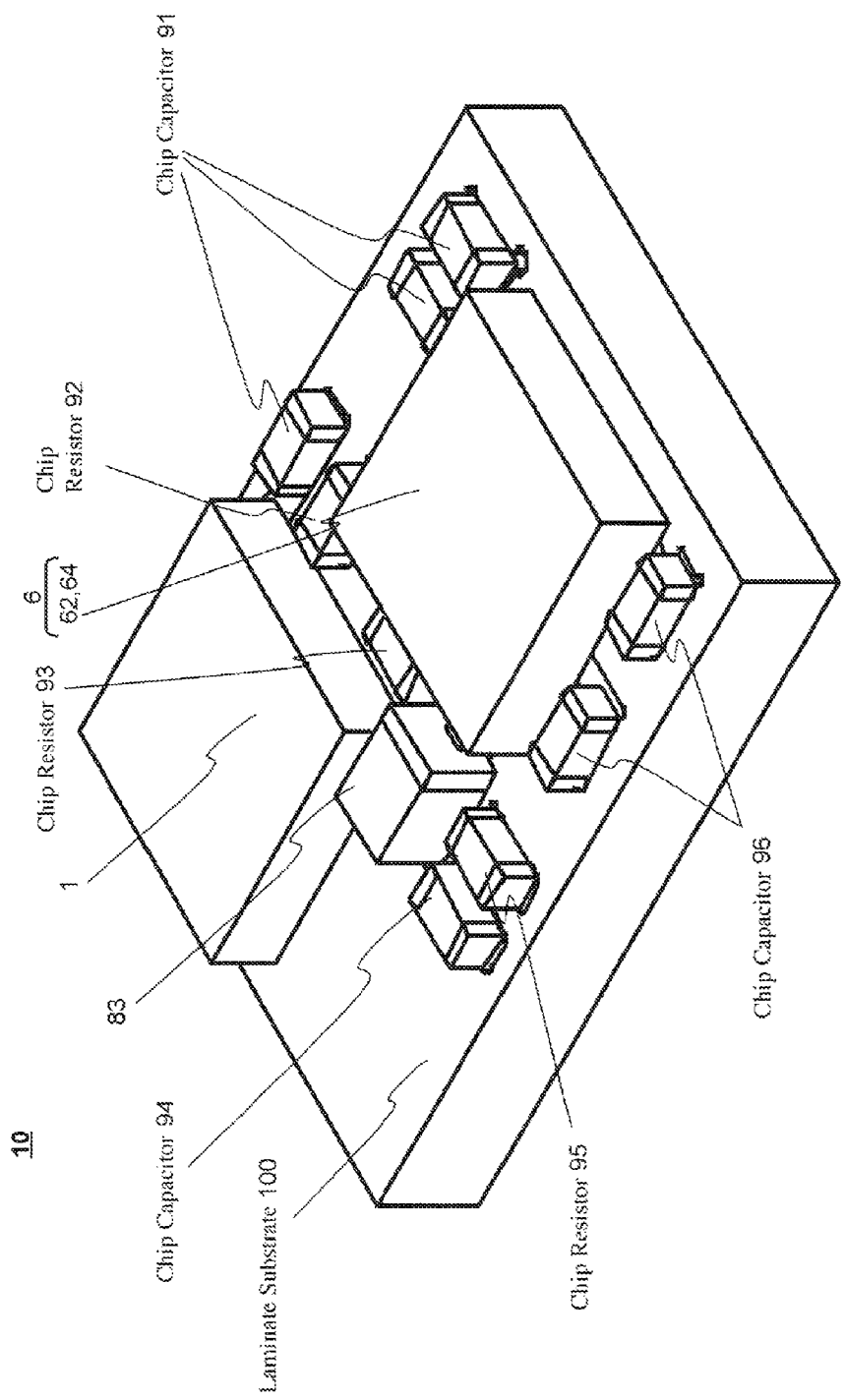
FIG. 26 is a perspective view showing according to an embodiment of the present invention high-frequency circuit device.
Figure 27:
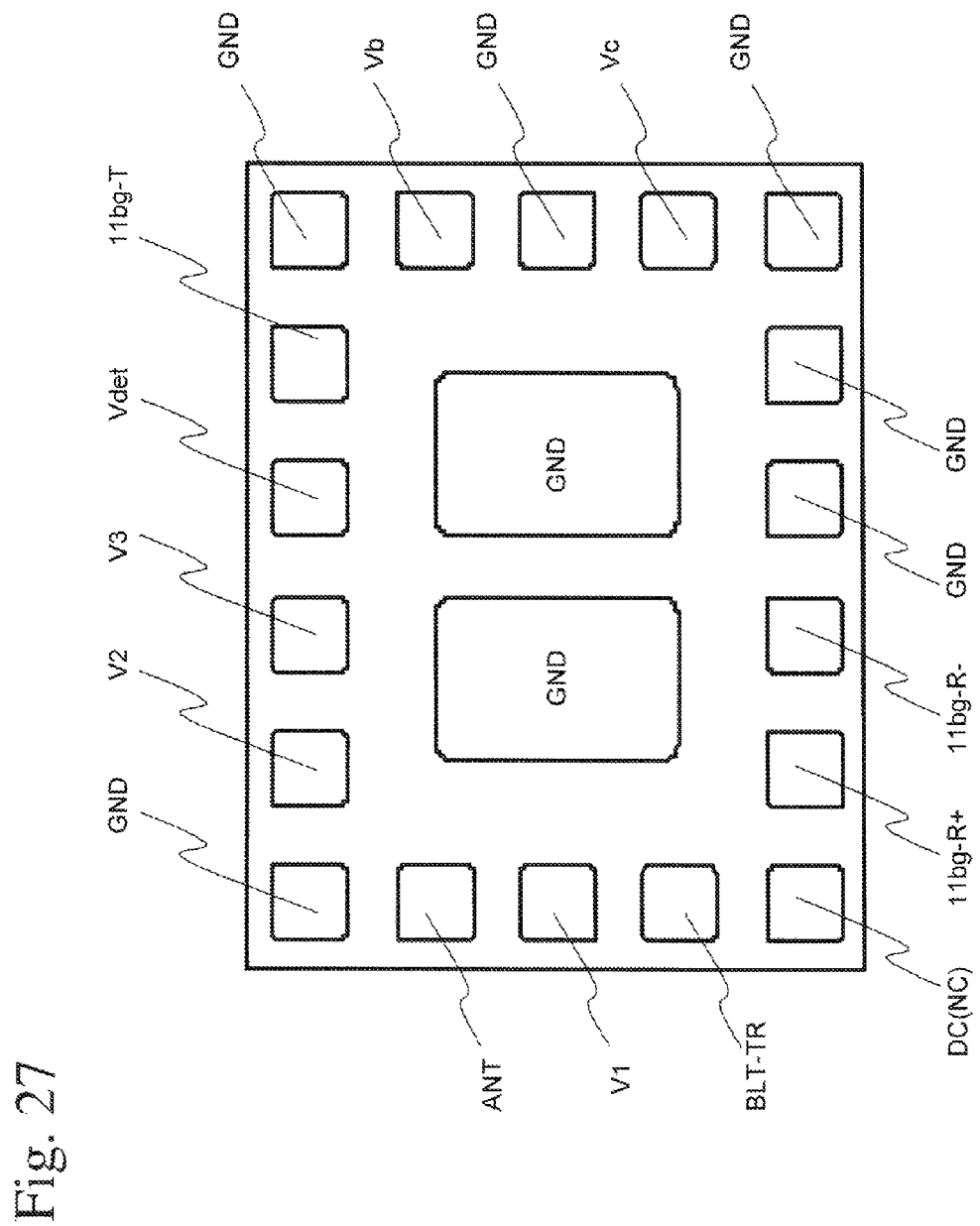
FIG. 27 is a bottom view showing a laminate substrate constituting the high-frequency circuit device according to an embodiment of the present invention.
Figure 28:
FIG. 28 is a development view showing electrode patterns on layers in the laminate substrate constituting the high-frequency circuit device according to an embodiment of the present invention.

The high-frequency circuit device of the present invention comprises a laminate of dielectric ceramic layers with electrode patterns, and at least one semiconductor element mounted on the laminate. FIG. 26 shows the appearance of the high-frequency circuit device 10 having the high-frequency circuit shown in FIGS. 1 and 11, FIG. 27 shows a bottom surface of the laminate substrate 100 of the high-frequency circuit device 10, and FIG. 28 shows the structure of each layer in the laminate substrate 100. This high-frequency circuit device 10 comprises the high-frequency switch circuit 1, the first bandpass filter 2, the balanced-unbalanced conversion circuit 3, the high-frequency power amplifier circuit 6, and the detection circuit 8. An upper surface of the laminate substrate 100 is provided with pluralities of land electrodes, on which chip parts not contained in the laminate substrate 100 are mounted, and the high-frequency switch circuit 1, the high-frequency power amplifier circuit 6, the Schottky diode 83, the chip capacitors 91, 94, 96, and the chip resistors 92, 93, 95 are mounted on the land electrodes as shown in FIG. 26. The land electrodes are connected to connecting lines and circuit elements in the laminate substrate 100 through via-holes.

The high-frequency switch circuit 1 may be mounted in a bare state on the land electrode of the laminate substrate 100, and sealed with a resin or a pipe. Miniaturization can be achieved by constituting the high-frequency circuit device 10 by the laminate substrate 100 and parts mounted thereon. Of course, RF-IC and baseband IC constituting the transmitting/receiving circuit may be integrated in the laminate substrate 100.

The laminate substrate 100 is made of dielectric ceramics sinterable at as low temperatures as, for instance, 1000° C. or lower. The laminate substrate 100 may be produced by printing each ceramic green sheet as thick as 10-200 μm with a conductive paste of low-resistivity Ag, Cu, etc. to form predetermined electrode patterns, integrally laminating pluralities of green sheets with electrode patterns, and sintering the resultant laminate.

The dielectric ceramics include, for instance, (a) dielectric ceramics comprising Al, Si and Sr as main components, and Ti, Bi, Cu, Mn, Na, K, etc. as sub-components, (b) dielectric ceramics comprising Al, Si and Sr as main components, and Ca, Pb, Na, K, etc. as sub-components, (c) dielectric ceramics comprising Al, Mg, Si and Gd, (d) dielectric ceramics comprising Al, Si, Zr and Mg, etc. The dielectric ceramics preferably have dielectric constants of about 5-15. In addition to the dielectric ceramics, resins, or composites of resins and dielectric ceramic powder may be used. According to an HTCC (high-temperature co-fired ceramic) method, dielectric ceramic substrates based on $Al_2O_3$ are provided with high-temperature-sinterable metal patterns of tungsten, molybdenum, etc., and integrally sintered.

The internal structure of the laminate substrate 100 will be explained referring to FIGS. 27 and 28. An uppermost green sheet 201 is provided with land electrodes, on which parts are mounted, and second to 16th green sheet layers 202-216 are provided with line electrodes, capacitor electrodes and ground electrodes, which are connected through via-holes (shown by black circles in the figure) formed in the green sheets. The lowermost green sheet 216 is provided with a wide ground electrode GND, a bottom surface of which has terminal electrodes to be mounted on a circuit board.

If isolation were insufficient among the input-matching circuit, voltage supply circuit and output-matching circuit of the high-frequency power amplifier circuit 6, malfunction and oscillation would be likely to occur in the power amplifier. To secure isolation among these circuits, the arrangement of planar ground electrodes and via-holes connected thereto should be optimized. To avoid the influence of unnecessary noise from the high-frequency power amplifier circuit 6, electrodes constituting the bandpass filter 2 connected to the antenna ANT are desirably arranged as distant from the high-frequency power amplifier circuit 6 as possible. Likewise, electrodes constituting the balanced-unbalanced conversion circuits disposed in the receiving path of wireless LAN and the transmitting/receiving path of Bluetooth are desirably arranged as distant from the high-frequency power amplifier circuit 6 as possible. Thus, the intrusion of unnecessary noise generated from the high-frequency power amplifier circuit 6 is reduced, resulting in the improved receiving sensitivity.

Disposed on the bottom surface of the laminate substrate 100 are, as shown in FIG. 27, two ground electrodes GND in a center portion, an antenna port ANT in a periphery, the transmitting port 11gb-T of wireless LAN, the receiving ports 11bg-R+, 11bg-R− of wireless LAN, a transmitting/receiving port BLT-TR of Bluetooth, a ground port GND, control ports V1, V2, V3 for the high-frequency switch circuit 1, power source ports Vc, Vb for the high-frequency power amplifier circuit, and a output voltage port Vdet of the detection circuit.

Each terminal electrode is depicted by the same symbols as in FIG. 11. Although the terminal electrodes are in a land grid array (LGA) in the embodiment, they may be in a ball grid array (BGA), etc.

Figure 30:
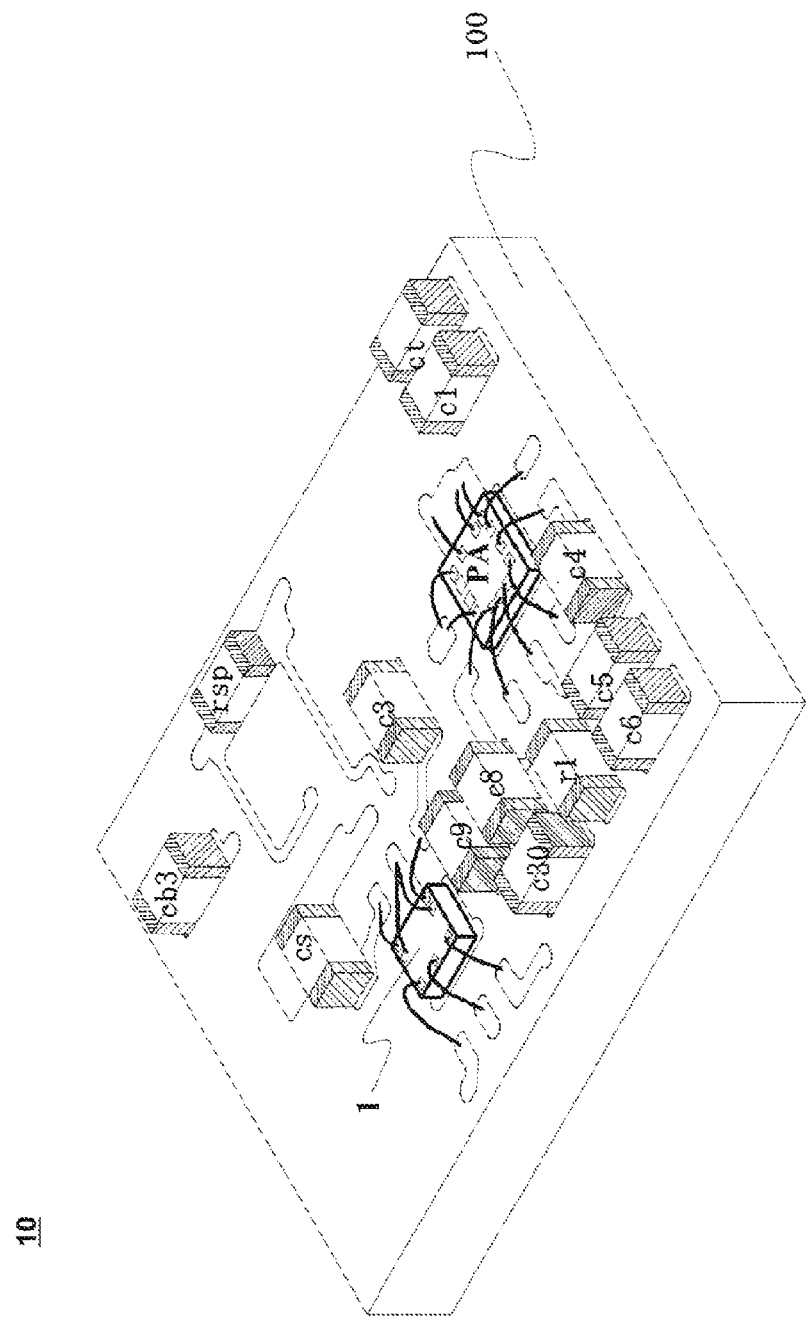
FIG. 30 is a perspective view showing a high-frequency circuit device according to another embodiment of the present invention.

FIG. 30 shows the appearance of a high-frequency circuit device 10 comprising a laminate substrate 100 having the high-frequency circuit (equivalent circuit) shown in FIGS. 5 and 20, and FIGS. 31(a)-(c) show the structure of each layer in the laminate substrate 100. The high-frequency circuit device 10 comprises a high-frequency switch circuit 1, a first bandpass filter 2, balanced-unbalanced conversion circuits 3, 4, a high-frequency power amplifier circuit 6 having a detection circuit, and a splitter circuit 9. The high-frequency switch circuit 1 is as shown in FIG. 21, and the high-frequency power amplifier circuit 6 is as shown in FIG. 24. Mounted on pluralities of land electrodes on the upper surface of the laminate substrate 100 are a high-frequency switch circuit 1 of SPDT, a power amplifier circuit part PA for the high-frequency power amplifier circuit 6, chip capacitors cb3, cs, c3, c9, c8, c30, ct, c1, c4, c5, c6, and chip resistors rsp, r1. The land electrodes are connected to connecting lines and circuit elements in the laminate substrate 100 through via-holes. Although chip capacitors and chip resistors are mounted on the upper surface of the laminate substrate 100 in FIG. 30, they may be formed in the laminate substrate 100.

The high-frequency switch circuit 1 and the power amplifier circuit part PA may be mounted in a bare state on the land electrodes of the laminate substrate, and sealed with a resin to provide the high-frequency circuit device 10. Miniaturization is thus achieved by constituting the high-frequency circuit device in the form of a laminate substrate. Of course, RF-IC and baseband IC constituting the transmitting/receiving circuit parts may be integrated in the laminate substrate 100.

Figure 31A:
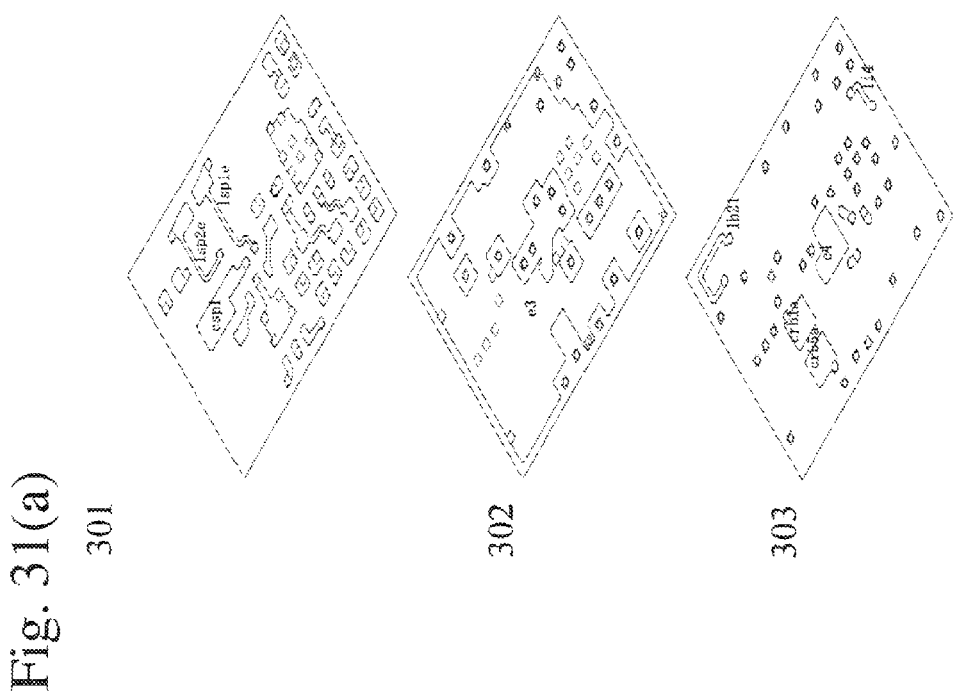
FIG. 31($a$) is a development view showing electrode patterns on first to sixth layers in the laminate substrate constituting the high-frequency circuit device according to another embodiment of the present invention.
Figure 31B:
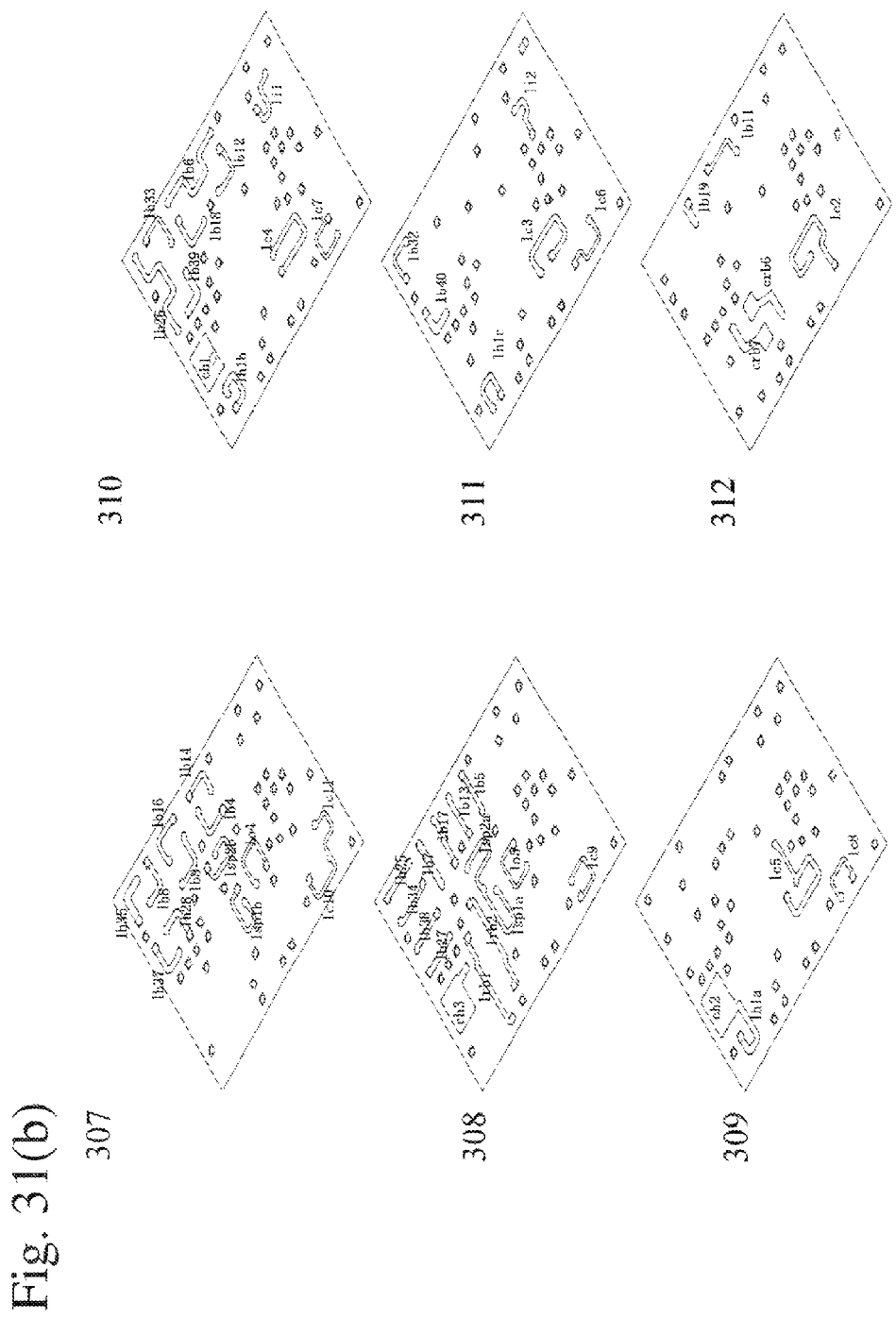
Figure 31C:
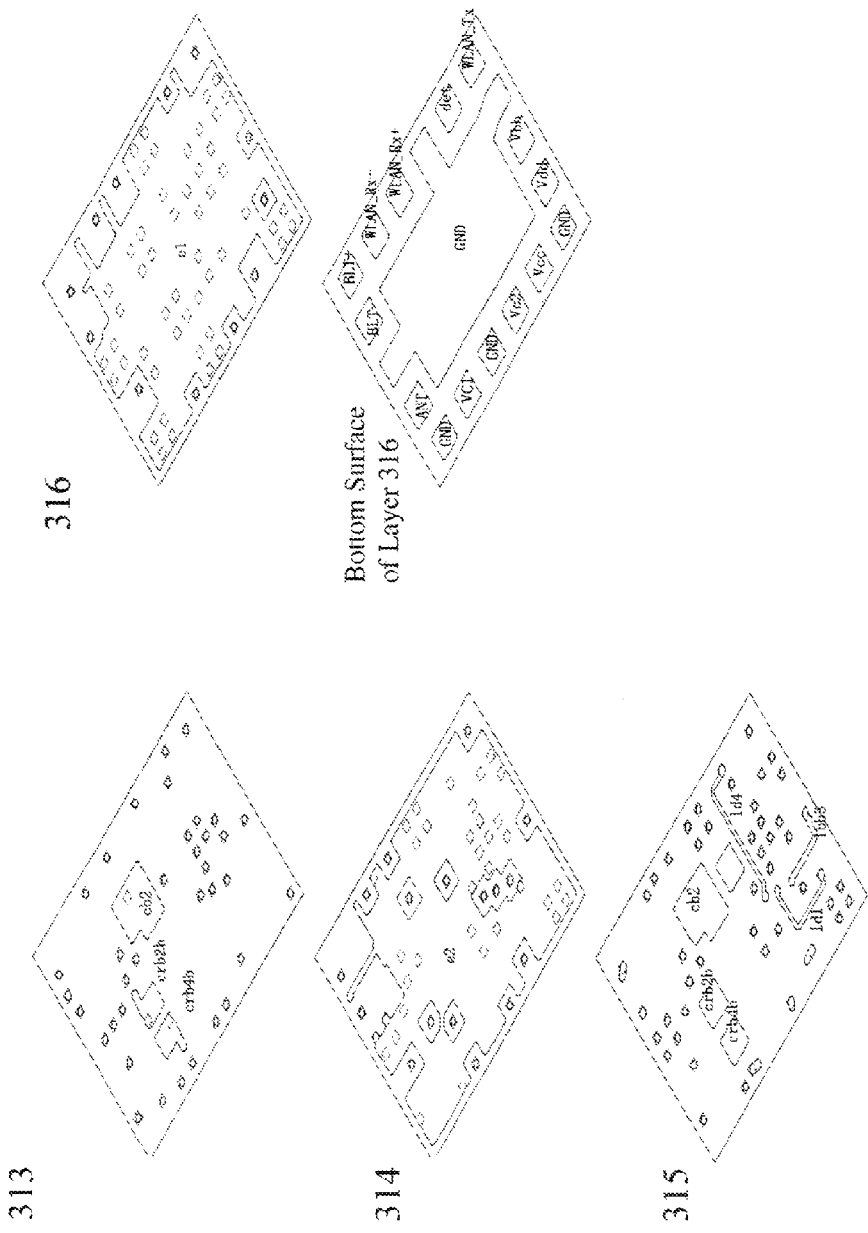

As shown in FIGS. 31(a)-(c), an uppermost (first) green sheet 301 in the laminate substrate 100 is provided with land electrodes on which parts are mounted, an electrode csp1 for a capacitance element, and electrodes lsp2e, lsp1e for inductance elements. A second green sheet layer 302 is provided with a ground electrode e3. A third green sheet layer 303 is provided with electrodes crb1a, crb5a for capacitance elements, electrodes lb21, li4 for inductance elements, and a ground electrode e4. A fourth green sheet layer 304 is provided with electrodes crb1b, crb6b for capacitance elements, and electrodes lb22, lb30, lb2 for inductance elements. A fifth green sheet layer 305 is provided with electrodes crb1c, crb5c for capacitance elements, and electrodes lb10, lsp2d, lsp1d, lo1, lo2, li3 for inductance elements. A sixth green sheet layer 306 is provided with electrodes crb1d, crb5d for capacitance elements, and electrodes lb23, lb29, lb36, lb9, lb3, lb15, lsp2c, lsp1c, lo3, lc12 for inductance elements. A seventh green sheet layer 307 is provided with electrodes lb35, lb37, lb8, lb28, lb16, lb8, lb14, lb4, lsp2b, lsp1b, lo4, lc10, lc11 for inductance elements. An eighth green sheet layer 308 is provided with an electrode ch3 for a capacitance element, and electrodes lb25, lb34, lb38, lb27, lb7, lb17, lb13, lb5, lsp2a, lsp1a, lo5, lc9, lrb1, lrb2 for inductance elements. A ninth green sheet layer 309 is provided with an electrode ch2 for a capacitance element, and electrodes lh1a, lc5, lc8 for inductance element. A 10th green sheet layer 310 is provided with an electrode ch1 for a capacitance element, and electrodes lb26, lb33, lb39, lb6, lb18, lb12, lh1b, lc4, lc7, li1 for inductance elements. An 11th green sheet layer 311 is provided with electrodes lb32, lb40, lh1c, lc3, lc6, li2 for inductance elements. A 12th green sheet layer 312 is provided with electrodes crb7, crb6 for capacitance elements, and electrodes lb19, lb11, lc2 for inductance elements. A 13th green sheet layer 313 is provided with electrodes cb2, crb2b, crb4b for capacitance elements. A 14th green sheet layer 314 is provided with a ground electrode e2. A 15th green sheet layer 315 is provided with electrodes cb2, crb2b, crb4b for capacitance elements, and electrodes ld4, ld1, lbb3 for inductance elements. A 16th green sheet layer (lowermost layer) 316 is provided with a ground electrode e1. A bottom surface of the green sheet 316 is provided with terminal electrodes for mounting on a circuit board.

The line electrodes for inductance elements, the electrodes for capacitance elements, and the ground electrodes are connected through via-holes formed in the green sheets. The symbols in FIGS. 31(a) to 31(c) are substantially identical to those in FIGS. 20 and 24, as shown in Table 7. For instance, the line electrode lh1 for an inductance element in FIG. 20 is constituted by the electrodes lh1a, lh1b, lh1c in FIGS. 31(a) to 31(c). The same is true of the other electrodes.

TABLE 7

| FIG. 20 | FIGS. 31(a) to 31(c) |
| --- | --- |
| lh1 | lh1a, lh1b, lh1c |
| crb1 | crb1b, crb1c, crb1d |
| crb5 | crb5b, crb5c, crb5d |
| crb2 | crb1a, crb2a, crb2b |
| lsp1 | lsp1a, lsp1b, lsp1c, lsp1d, lsp1e |
| lsp2 | lsp2a, lsp2b, lsp2c, lsp2d, lsp2e |
| lb3 | lb3, lb4, lb5, lb6 |
| lb6 | lb6, lb7, lb8, lb9, lb10 |
| lb11 | lb11, lb12, lb13, lb14, lb15 |
| lb15 | lb15, lb16, lb17, lb18, lb19 |
| lb22 | lb22, lb23, lb24, lb25, lb26 |
| lb26 | lb26, lb27, lb28, lb29, lb30 |
| lb31 | lb31, lb32, lb33, lb34, lb35, lb36 |
| lb36 | lb36, lb37, lb38, lb39, lb40 |
| lc2 | lc2, lc3, lc4, lc5 |
| lc6 | lc6, lc7, lc8, lc9, lc10 |
| lc11 | lc11, lc12 |
| lo2 | lo2, lo3, lo4, lo6 |
| li3 | li3, li4 |
| li1 | li1, li2 |

If isolation were insufficient among the input-matching circuit, voltage supply circuit and output-matching circuit of the high-frequency power amplifier circuit 6, malfunction and oscillation would be likely to occur in the power amplifiers. Accordingly, to secure isolation among these circuits, the arrangement of planar ground electrodes and via-holes connected thereto is optimized. To avoid the influence of unnecessary noise generated from the high-frequency power amplifier circuit 6, electrodes constituting the bandpass filter connected to the antenna ANT are preferably disposed as distant from the high-frequency power amplifier circuit 6 as possible. Similarly, electrodes constituting the balanced-unbalanced conversion circuits in the receiving path of wireless LAN and the transmitting/receiving path of Bluetooth are preferably disposed as distant from the high-frequency power amplifier circuit 6 as possible. This improves the reduction of unnecessary noise generated from the high-frequency power amplifier circuit 6, thereby improving the receiving sensitivity.

As shown in FIGS. 31(a) to 31(c), the bottom surface of the laminate substrate 100 is provided with the ground electrode GND in a center portion, the antenna port ANT in a periphery, the transmitting port 11bg-T of wireless LAN, the receiving ports 11bg-R+, 11bg-R− of wireless LAN, the transmitting/receiving ports BLT-TR+, BLT-TR− of Bluetooth, Bluetooth ground port GND, the control ports Vc1, Vc2 for the high-frequency switch circuit, the power source ports Vc, Vb, Vdd for the high-frequency power amplifier circuit, and the output voltage port Vdet of the detection circuit.

Figure 32:
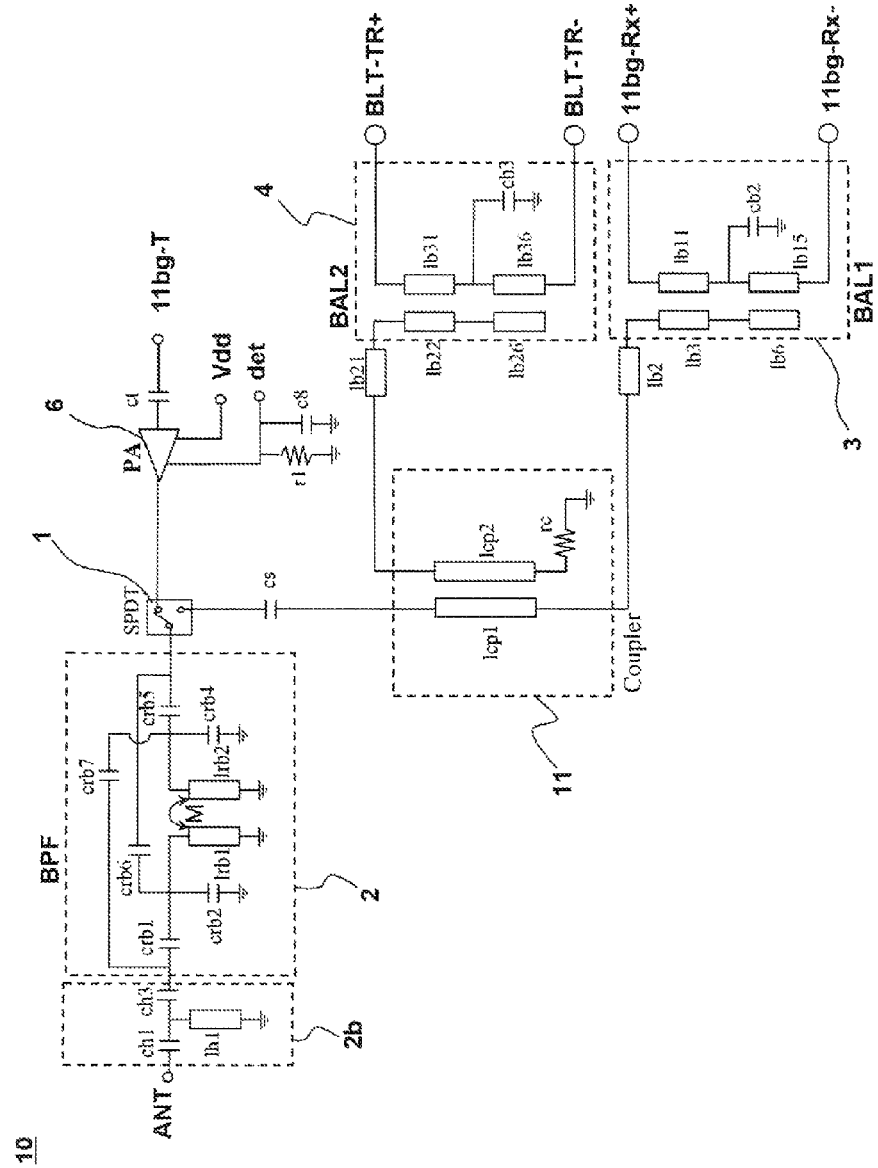
FIG. 32 is a view showing the equivalent circuit of a high-frequency circuit device according to another embodiment of the present invention.

FIG. 32 shows the equivalent circuit of a high-frequency circuit device according to a still further embodiment of the present invention. In this embodiment, the circuit is the same as shown in FIG. 20, except that the splitter circuit 9 is replaced by a coupler circuit 11. The coupler circuit 11 has a main line connected to the receiving circuit of wireless LAN, and a sub-line connected to the transmitting/receiving circuit of Bluetooth. The coupling ratio of the main line to the sub-line may be arbitrarily set. For instance, a ratio of the receiving circuit of wireless LAN to the transmitting/receiving circuit of Bluetooth may be set at 10:1.

Figure 33:
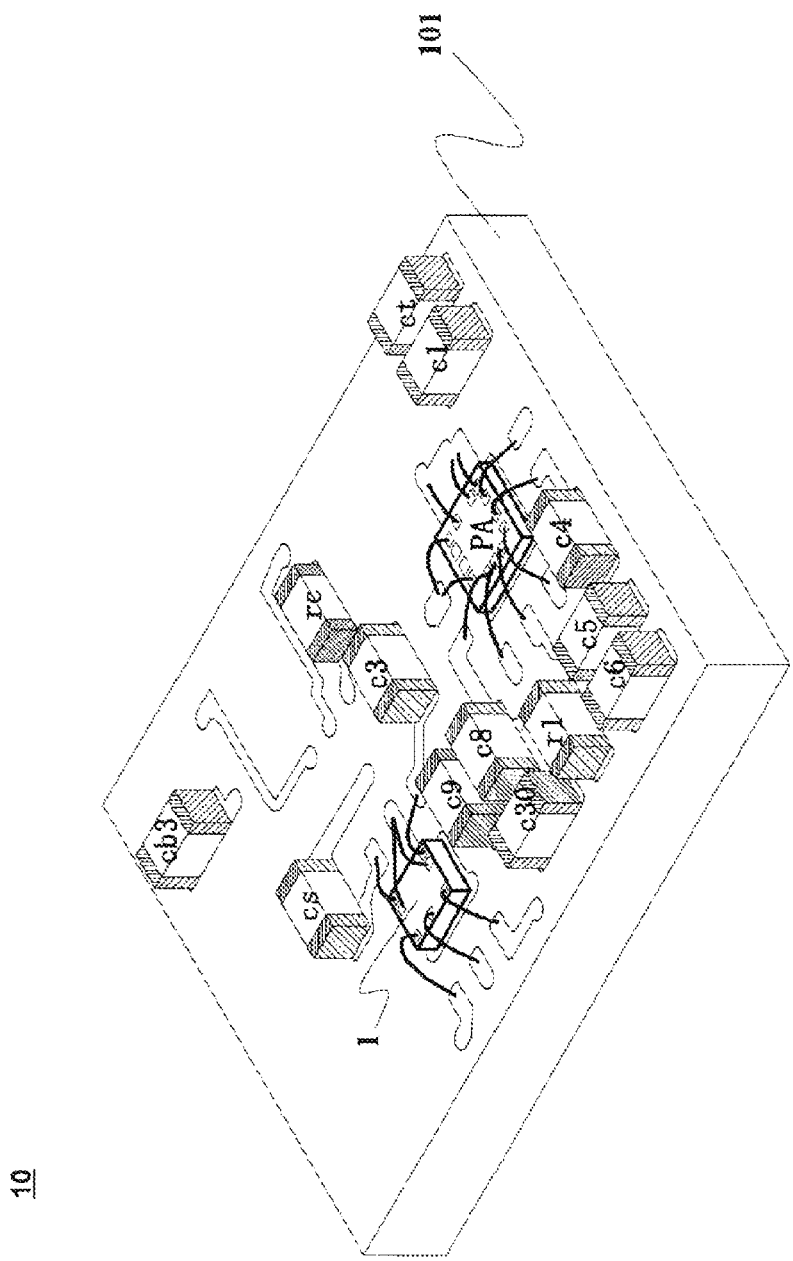
FIG. 33 is a perspective view showing a high-frequency circuit device according to a still further embodiment of the present invention.

FIG. 33 shows the appearance of the high-frequency circuit device of FIG. 32, and FIGS. 34(a) to 34(c) show the layer structure of its laminate substrate 101. The circuit in this embodiment is the same as shown in FIGS. 30 and 31(a) to 31(c), except that the splitter circuit is replaced by a coupler circuit. Mounted on the laminate substrate 101 is the resistance element rc of the coupler circuit in place of the resistance element rsp shown in FIG. 30.

Figure 34A:
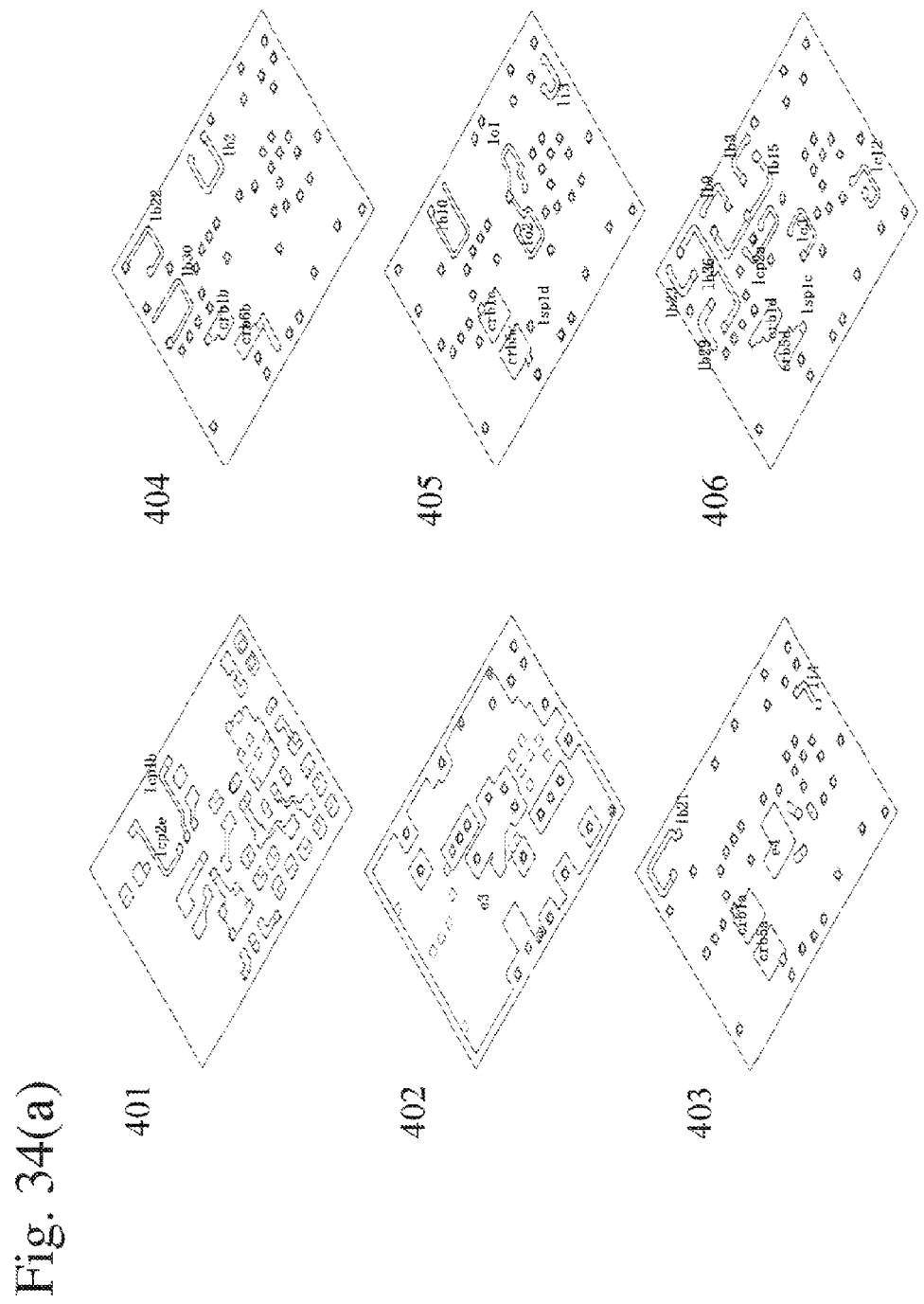
FIG. 34($a$) is a development view showing electrode patterns on first to sixth layers in the laminate substrate constituting the high-frequency circuit device according to a still further embodiment of the present invention.
Figure 34B:
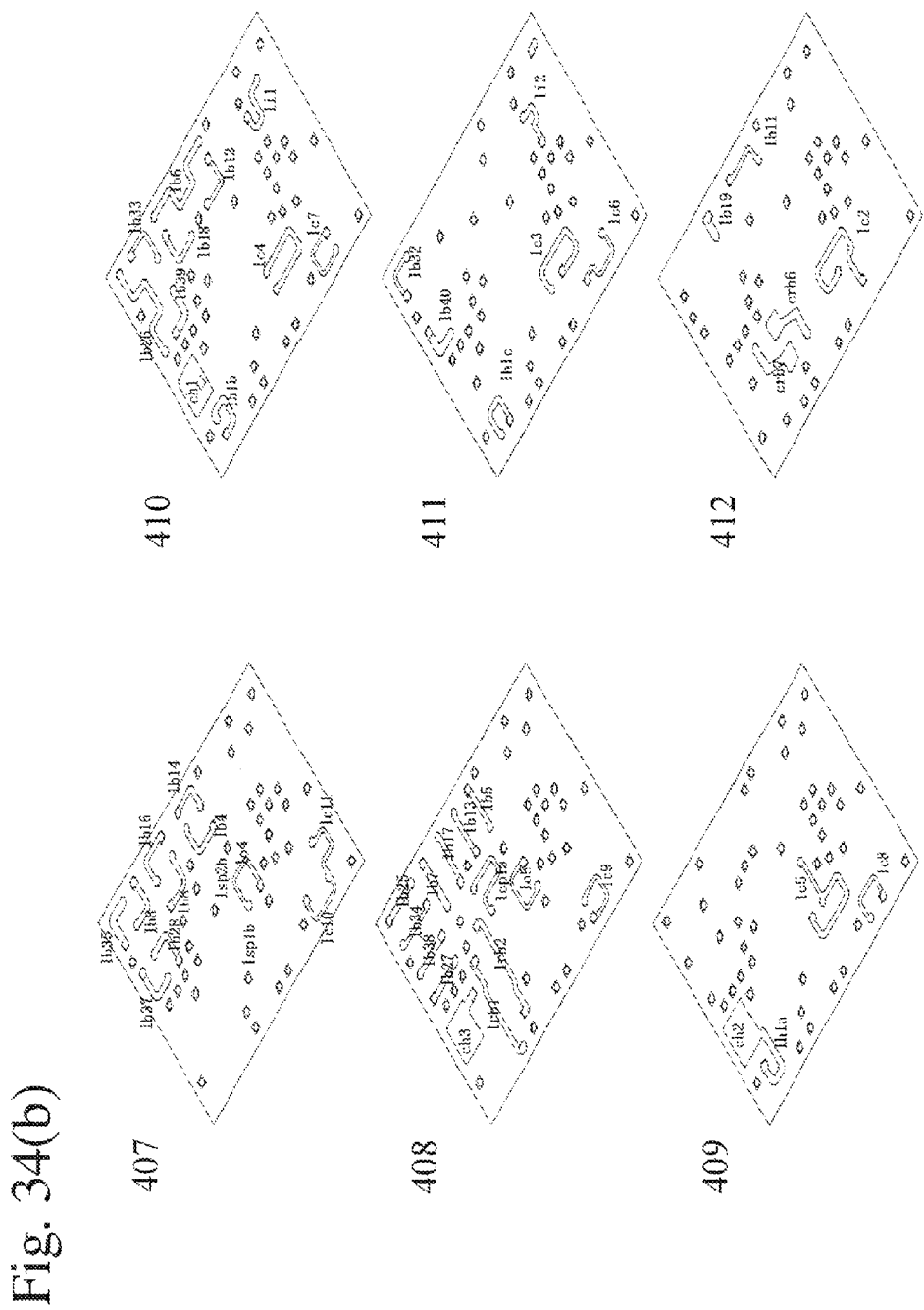
Figure 34C:
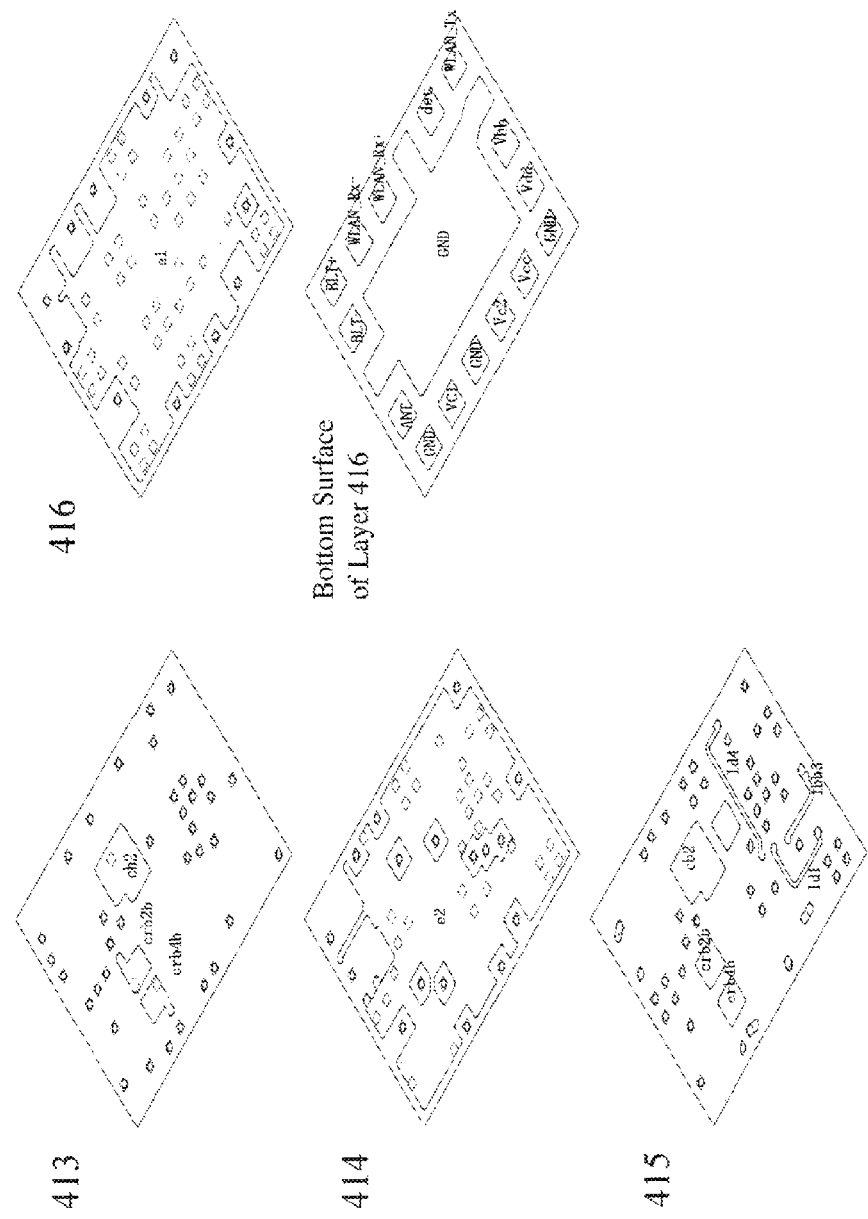
Figure 35:
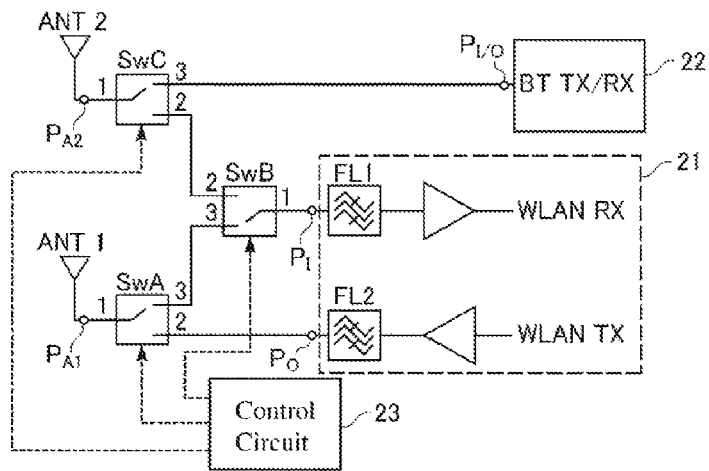
FIG. 35 is a block diagram showing the circuit of a conventional communications apparatus usable for both wireless LAN and Bluetooth.
Figure 36:
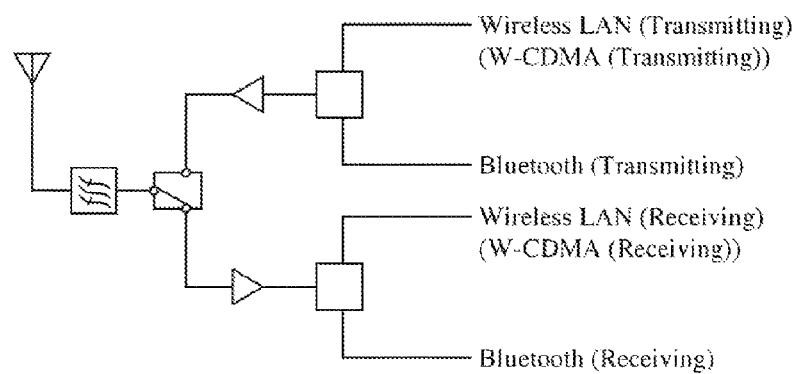
FIG. 36 is a block diagram showing the circuit of a conventional communications apparatus usable for both wireless LAN and Bluetooth.

As shown in FIGS. 34(a) to 34(c), an uppermost (first) green sheet 401 of the laminate substrate 101 is provided with land electrodes on which parts are mounted, and electrodes lcp2b, lcp1b for inductance elements. A second green sheet layer 402 is provided with a ground electrode e3. A third green sheet layer 403 is provided with electrodes crb1a, crb5a for capacitance elements, electrodes lb21, li4 for inductance elements, and a ground electrode 4. A fourth green sheet layer 404 is provided with electrodes crb1b, crb6b for capacitance elements, and electrodes lb22, lb30, lb2 for inductance elements. A fifth green sheet layer 405 is provided with electrodes crb1c, crb5c for capacitance elements, and electrodes lb10, lo1, lo2, li3 for inductance elements. A sixth green sheet layer 406 is provided with electrodes crb1d, crb5d for capacitance elements, and electrodes lb23, lb29, lb36, lb9, lb3, lb15, lcp2a, lo3, lc12 for inductance elements. A seventh green sheet layer 407 is provided with electrodes lb35, lb37, lb8, lb28, lb16, lb8, lb14, lb4, lo4, lc10, lc11 for inductance elements. An eighth green sheet layer 408 is provided with an electrode ch3 for a capacitance element, and electrodes lb25, lb34, lb38, lb27, lb7, lb17, lb13, lb5, lrb1, lrb2, lcp1a, lo5, lc9 for inductance elements. A ninth green sheet layer 409 is provided with an electrode ch2 for a capacitance element, and electrodes lh1a, lc5, lc8 for inductance elements. A 10th green sheet layer 410 is provided with an electrode ch1 for a capacitance element, and electrodes lb26, lb33, lb39, lb6, lb18, lb12, lh1b, lc4, lc7, li1 for inductance elements. An 11th green sheet layer 411 is provided with electrodes lb32, lb40, lh1c, lc3, lc6, li2 for inductance elements. A 12th green sheet layer 412 is provided with electrodes crb7, crb6 for capacitance elements, and electrodes lb19, lb11, lc2 for inductance elements. A 13th green sheet layer 413 is provided with electrodes cb2, crb2b, crb4b for capacitance elements. A 14th green sheet layer 414 is provided with a ground electrode e2. A 15th green sheet layer 415 is provided with electrodes cb2, crb2b, crb4b for capacitance elements, and electrodes ld4, ld1, lbb3 for inductance elements. A 16th green sheet layer 416 is provided with a ground electrode e1. A bottom surface of the lowermost green sheet 416 is provided with terminal electrodes for mounting on a circuit board.

The line electrodes for inductance elements, the electrodes for capacitance elements, and the ground electrodes are connected through via-holes. The symbols in FIGS. 34(a) to 34(c) are identical to those in FIGS. 32 and 33 as much as possible. The coupler circuit lcp1 is constituted by lcpla, lcp1b in the laminate, and lcp2 is constituted by lcp2a, lcp2b.

Figure 29:
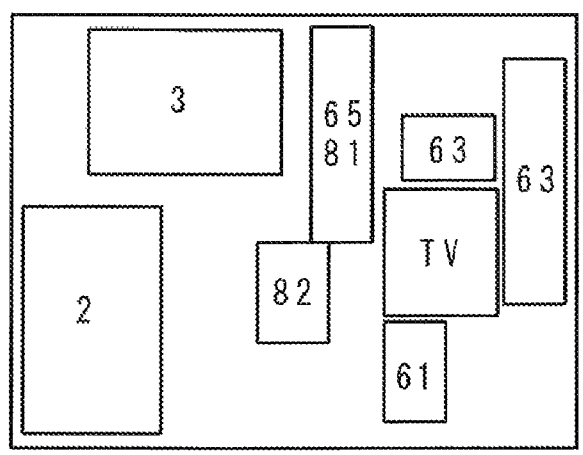
FIG. 29 is a view showing the internal structure of the laminate substrate constituting the high-frequency circuit device according to an embodiment of the present invention.

In any of the above embodiments, a portion of the laminate substrate 100, on which the high-frequency power amplifier circuit 6 is mounted, is preferably provided with thermal-vias TV for enhancing heat radiation from an upper surface to a bottom surface. To suppress unnecessary noise radiation, the green sheets 202, 214, 216 are preferably provided with a wide ground electrode GND. In the laminate substrate 100 having a three-dimensional circuit, electrode patterns constituting the circuit are preferably separated by via-holes connected to the planar ground electrode GND and the ground electrode GND, and avoid overlapping in a lamination direction, to prevent unnecessary electromagnetic interference with electrode patterns constituting the other circuit. FIG. 29 shows an example of the planar arrangement of such a circuit, with positional differences neglected in a lamination direction.

EFFECT OF THE INVENTION

The high-frequency circuit of the present invention commonly usable in at least two different communications systems using substantially the same frequency band, and the high-frequency circuit device and the communications apparatus comprising such high-frequency circuit are suitable for miniaturization, because of small numbers of parts.

What is claimed is:

1. A high-frequency circuit disposed between an antenna which transmits and receives in at least two different first and second communications systems and transmitting/receiving circuits for the at least two different communications systems, comprising:
    a high-frequency switch circuit comprising a first terminal, a second terminal, a third terminal, and a fourth terminal for switching a three-way connection of said antenna to a transmitting circuit of the first communications system via the third terminal, a receiving circuit of the first communications system via the second terminal, and a transmitting/receiving circuit of the second communications system via the first terminal;
    a first bandpass filter that is coupled to the antenna and the fourth terminal and suppresses signal components with frequencies higher and lower than frequency bands of said first and second communications systems,
    wherein the first bandpass filter is an only bandpass filter disposed in a first path between said antenna and said receiving circuit of the first communications system, and in a second path between said antenna and said transmitting/receiving circuit of the second communications system, and
    other bandpass filters are not disposed in the first and second paths; and
    a first balanced-unbalanced conversion circuit which is coupled to the receiving circuit of said first communications system and the second terminal of said high-frequency switch circuit.

2. The high-frequency circuit according to claim 1, comprising a second balanced-unbalanced conversion circuit between said transmitting/receiving circuit for the second communications system and said high-frequency switch circuit.

3. The high-frequency circuit according to claim 1, comprising a high-frequency power amplifier circuit between the transmitting circuit for said first communications system and said high-frequency switch circuit.

4. The high-frequency circuit according to claim 3, comprising a second bandpass filter between said high-frequency power amplifier circuit and the transmitting circuit for said first communications system.

5. The high-frequency circuit according to claim 3, comprising a third balanced-unbalanced conversion circuit between the transmitting circuit for said first communications system and said high-frequency power amplifier circuit.

6. A high-frequency circuit device having the high-frequency circuit recited in claim 1, which comprises a laminate of dielectric ceramics and electrode patterns, and at least one semiconductor element mounted on said laminate; (a) said electrode patterns constituting at least part of inductance elements and/or capacitance elements, which mainly constitute (1) at least one of said first bandpass filter and said first balanced-unbalanced conversion circuit, (2) at least one of said first bandpass filter and said splitter or coupler circuit, or (3) at least one of said first bandpass filter, said first balanced-unbalanced conversion circuit and said splitter or coupler circuit, and (b) said semiconductor elements constituting (1) said high-frequency switch circuit, or (2) said high-frequency switch circuit and/or said high-frequency power amplifier circuit.

7. A communications apparatus comprising the high-frequency circuit recited in claim 1.

* * * * *